(12) United States Patent
Sato

(10) Patent No.: US 12,456,885 B2
(45) Date of Patent: Oct. 28, 2025

(54) POWER TRANSMITTING APPARATUS, CONTROL METHOD FOR POWER TRANSMITTING APPARATUS, AND STORAGE MEDIUM

(71) Applicant: CANON KABUSHIKI KAISHA, Tokyo (JP)

(72) Inventor: Ryosuke Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 708 days.

(21) Appl. No.: 17/678,880

(22) Filed: Feb. 23, 2022

(65) Prior Publication Data

US 2022/0224166 A1 Jul. 14, 2022

Related U.S. Application Data

(63) Continuation of application No. PCT/JP2020/026059, filed on Jul. 2, 2020.

(30) Foreign Application Priority Data

Aug. 29, 2019 (JP) .................. 2019-156801

(51) Int. Cl.
H02J 50/60 (2016.01)
H02J 50/80 (2016.01)
H02J 50/10 (2016.01)

(52) U.S. Cl.
CPC .............. H02J 50/60 (2016.02); H02J 50/80 (2016.02); H02J 50/10 (2016.02)

(58) Field of Classification Search
CPC .. H02J 50/12; H02J 50/80; H02J 50/70; H02J 50/90; H02J 50/402; H02J 50/20; H02J 50/10; H02J 50/60; H02J 7/0013; H02J 50/005; H02J 50/50; H02J 7/00034; H02J 2310/23; H02J 50/40; H02J 7/00304; H02J 7/00308; H02J 7/0044; H02J 7/0042; H02J 7/02; H02J 7/0048; H02J 7/007192; H02J 7/00; H02J 5/00; H02J 7/007188; H02J 7/00302; H02J 9/02; H02J 50/502; H02J 13/00006; H02J 13/00017; H02J 7/34; H02J 50/23; H02J 2300/20; H02J 2300/26; H02J 2300/40; H02J 3/381; H02J 3/388;
(Continued)

(56) References Cited

U.S. PATENT DOCUMENTS 10,326,309 B2 * 6/2019 Lee .................. H04B 5/79
2012/0235636 A1 * 9/2012 Partovi ............. H02J 7/0042
320/108
(Continued)

FOREIGN PATENT DOCUMENTS

CN 103296784 A 9/2013
CN 109196753 A 1/2019
(Continued)

Primary Examiner — Binh C Tat
(74) Attorney, Agent, or Firm — Canon U.S.A., Inc., IP Division

(57) ABSTRACT

A power transmitting apparatus, in a case where at least one of a transmission power measured in one state from among a plurality of different states or a received power obtained in the one state is unstable, does not use the transmission power and the received power in calculating the parameter used in determining whether or not an object not an intended power transmission target exists.

7 Claims, 13 Drawing Sheets

(58) Field of Classification Search
CPC .. H02J 3/466; H02J 7/0068; H02J 7/35; H02J 50/00; H02J 13/00022; H02J 2310/48; H02J 50/27; H02J 7/0029; H02J 7/00309; H02J 7/007194; H02J 2310/40; H02J 50/05; H02J 7/007; H02J 7/00711; H02J 7/00712; H02J 2207/20; H02J 7/00036; H02J 7/0019; H02J 7/0063; H04B 5/266; H04B 3/50; H04B 17/12; H04B 3/54
USPC .................................................. 320/137–144
See application file for complete search history.

(56) References Cited

U.S. PATENT DOCUMENTS

| | | | | |
|---|---|---|---|---|
| 2012/0306284 | A1* | 12/2012 | Lee | H04B 5/79 |
| | | | | 307/104 |
| 2013/0300204 | A1* | 11/2013 | Partovi | B60L 58/15 |
| | | | | 307/104 |
| 2014/0091626 | A1* | 4/2014 | Walley | H02J 50/80 |
| | | | | 307/104 |
| 2014/0125139 | A1 | 5/2014 | Wang | |
| 2014/0191568 | A1* | 7/2014 | Partovi | H02J 50/80 |
| | | | | 307/31 |
| 2017/0018977 | A1 | 1/2017 | Van Wageningen | |

FOREIGN PATENT DOCUMENTS

| | | |
|---|---|---|
| JP | 2013055529 A | 3/2013 |
| JP | 2013-230007 A | 11/2013 |
| JP | 2017-055529 A | 3/2017 |
| JP | 2017-070074 A | 4/2017 |
| KR | 20160028252 A | 3/2016 |

* cited by examiner

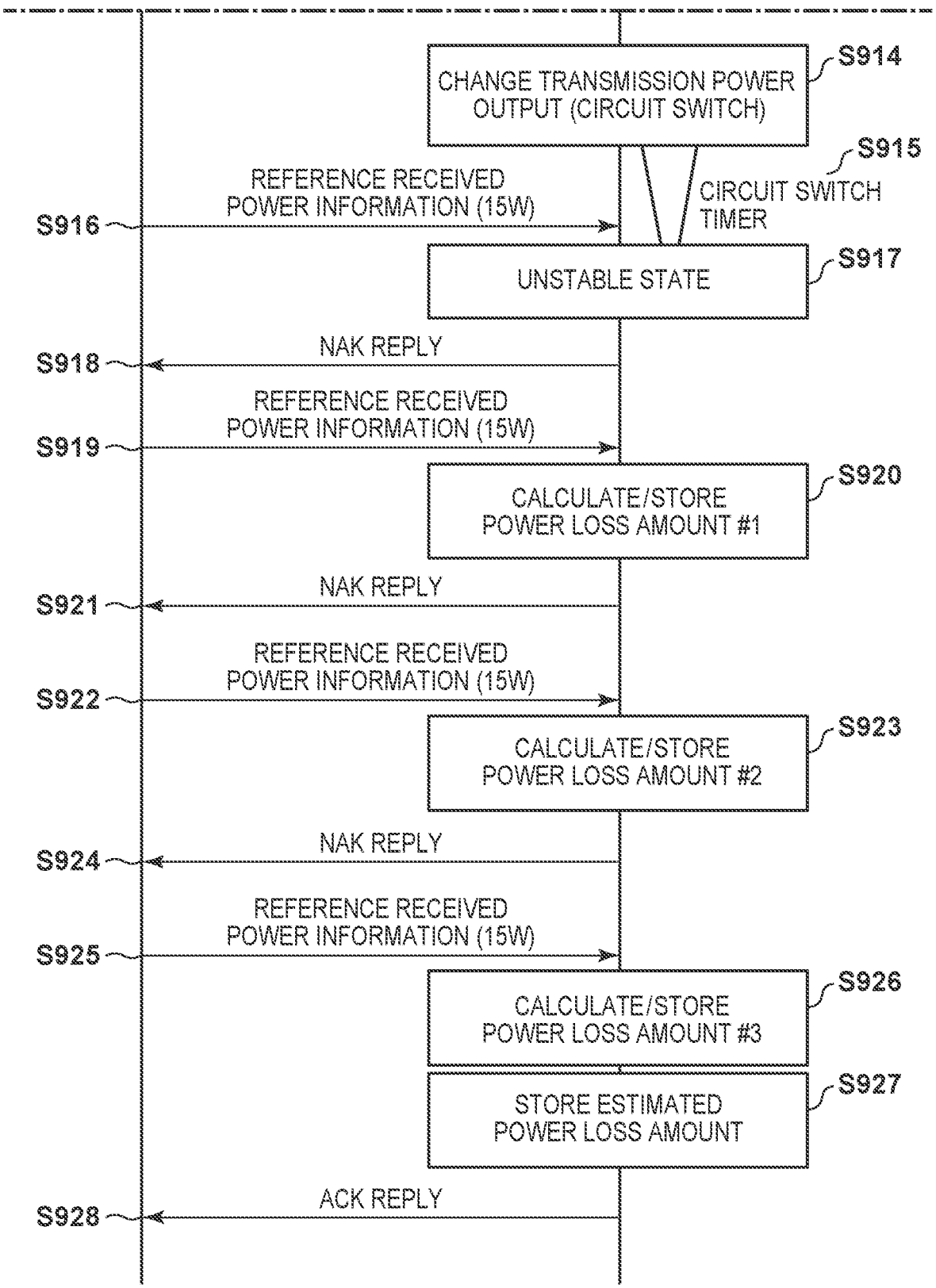

ated. In the calibration process, a transmission power of a power transmitting apparatus and the corresponding received power of a power receiving apparatus are obtained when the power receiving apparatus is in two different states. Then, using these two sets of transmission power and received power, a parameter for calibrating the received power or the transmission power when power is actually transmitted wirelessly is calculated. This parameter is used in the processing for detecting a foreign object. In other words, for example, with respect to the received power when power is wirelessly transmitted by the power transmitting apparatus, the received power calibrated using the parameter can be estimated, and a power loss, which is the difference between the actual transmission power of the power transmitting apparatus and the estimated received power can be calculated. Then, in a case where the power loss is greater than a predetermined value, it can be determined that there is a power loss caused by a foreign object.

POWER TRANSMITTING APPARATUS, CONTROL METHOD FOR POWER TRANSMITTING APPARATUS, AND STORAGE MEDIUM

CROSS-REFERENCE TO RELATED APPLICATIONS

This application is a Continuation of International Patent Application No. PCT/JP2020/026059, filed Jul. 2, 2020, which claims the benefit of Japanese Patent Application No. 2019-156801, filed Aug. 29, 2019, both of which are hereby incorporated by reference herein in their entireties.

BACKGROUND

Field

The present disclosure is related to a power transmitting apparatus, a control method for a power transmitting apparatus, and a storage medium.

Background Art

Development of technology relating to wireless power transmission systems such as wireless charging systems has been carried out extensively in recent years. For example, in Japanese Patent Laid-Open No. 2017-070074, a power transmitting apparatus is described which is compliant with a standard (hereinafter, referred to as the WPC standard) developed by the Wireless Power Consortium (WPC), a group for promoting wireless charging standardization. Also, in Japanese Patent Laid-Open No. 2017-070074, a calibration process is defined that increases the accuracy of the detection, near a power transmission antenna (coil), of an electrically conductive object (foreign object) such as a metal piece that is not an intended target for power transmission compliant with the WPC standard.

However, the transmission power of a power transmitting apparatus and the power loss between a power transmitting apparatus and a power receiving apparatus is not always constant. For example, a power transmitting unit of a power transmitting apparatus uses a switching circuit including a switching element (for example, a field effect transistor (hereinafter, referred to as an FET)) to convert a DC voltage or current to an AC voltage or current. For switching circuits, there are half bridge circuits including two FETs and full bridge circuits including four FETs. For the switching circuit of a power transmitting unit, it is widely known to operate while switching between these two circuits depending on the magnitude of the transmission power. Also, the electric power consumed by the switching circuit of the power transmitting unit in this operation or the electric power transmitted by the power transmitting antenna may fluctuate, temporarily increasing, and be unstable. Furthermore, for example, in a case where the power receiving apparatus placed on the power transmitting apparatus is a smart phone, it can be expected that vibrations or the like may cause misalignment and the received power may be unstable. When executing determination for foreign objects in the power transmitting process, if the parameter described above calculated using the transmission power and the received power under such conditions is used, a foreign object may be unable to be detected or a foreign object may be falsely detected.

CITATION LIST

Patent Literature

PTL 1: Japanese Patent Laid-Open No. 2017-070074

SUMMARY

In the present disclosure, technology is provided for improving the calculation accuracy of a parameter used to determine whether or not an object that is not the intended power transmission target exists.

According to one aspect of the present disclosure, there is provided a power transmitting apparatus, comprising: a power transmitting unit configured to wirelessly transmit power to a power receiving apparatus; a measuring unit configured to measure a transmission power transmitted by the power transmitting unit to the power receiving apparatus; an obtaining unit configured to obtain information representing a received power at the power receiving apparatus when power is transmitted to the power receiving apparatus by the power transmitting unit; a calculating unit configured to calculate a parameter used in determining whether or not an object not an intended power transmission target exists on the basis of a transmission power measured by the measuring unit when a received power at the power receiving apparatus is in a plurality of different states and a received power corresponding to the plurality of different states represented by information obtained by the obtaining unit; and a determining unit configured to determine whether or not an object not an intended power transmission target exists at a predetermined point in time on the basis of a parameter calculated by the calculating unit, a transmission power at the predetermined point in time measured by the measuring unit, and a received power corresponding to the predetermined point in time represented by information obtained by the obtaining unit, wherein in a case where at least one of a transmission power measured by the measuring unit in one state from among the plurality of different states or a received power represented by information obtained by the obtaining unit in the one state is unstable, the calculating unit does not use the transmission power and the received power in calculating the parameter.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain principles of the disclosure.

FIG. 9B is a diagram (2) illustrating an example of an operation sequence of a wireless power transmission system according to an embodiment.

DESCRIPTION OF THE EMBODIMENTS

Figure 1:
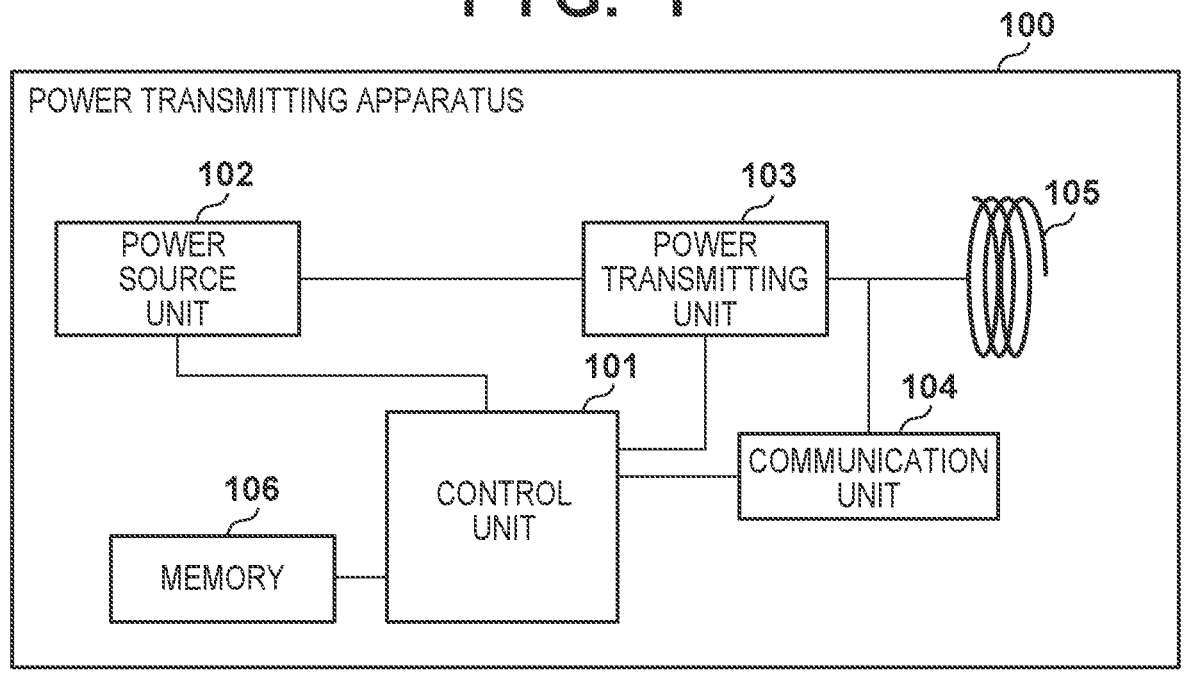
FIG. 1 is a block diagram illustrating an example configuration of a power transmitting apparatus according to an embodiment.

Hereinafter, embodiments will be described in detail with reference to the attached drawings. Note, the following embodiments are not intended to limit the scope of the present disclosure. Multiple features are described in the embodiments, but limitation is not made to the present disclosure that requires all such features, and multiple such features may be combined as appropriate. Furthermore, in the attached drawings, the same reference numerals are given to the same or similar configurations, and redundant description thereof is omitted.

Embodiments of the present disclosure are described below with reference to the drawings. Note that the embodiments described below are merely examples for describing the technical concept of the present disclosure, and the present disclosure is not limited by the configurations and methods described in the embodiments.

System Configuration

Figure 4:
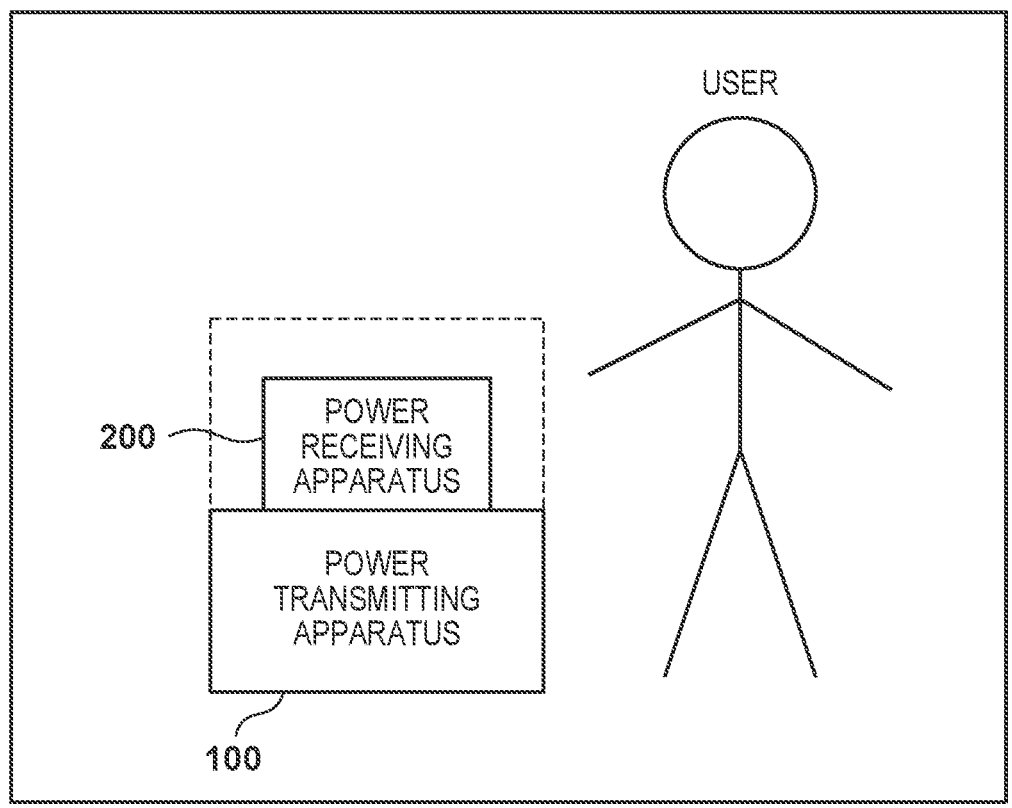
FIG. 4 is a diagram illustrating an example configuration of a wireless power transmission system according to an embodiment.

FIG. 4 is a diagram illustrating an example of the configuration of a wireless power transmission system (wireless charging system) according to the present embodiment. The present system includes a power transmitting apparatus 100 and a power receiving apparatus 200. Hereinafter, the power transmitting apparatus will be referred to as TX, and the power receiving apparatus will be referred to as RX. The TX 100 is an electronic device that wirelessly transmits power to the RX 200 placed in a charging stand provided in the TX 100. The RX 200 is an electronic device that charges a battery by receiving power via the TX 100. In the example described below, the RX 200 is placed on the charging stand. However, for the TX 100 to transmit power to the RX 200, as long as the RX 200 exists within the power-transmittal range (for example, the range representing by the dashed line in FIG. 4) of the TX 100, the RX 200 may not be placed on the charging stand.

Also, the RX 200 and the TX 100 may have a function of executing an application other than wireless charging. An example of the RX 200 is a smartphone, and an example of the TX 100 is an accessory device for charging the smartphone. The RX 200 and the TX 100 may be storage apparatuses, such as a hard disk or a memory device, or may be information processing apparatuses, such as a tablet, personal computer (PC), or the like. Also, the RX 200 and the TX 100, for example, may be image input apparatuses, such as an image capture apparatus (a camera, a video camera, and the like) or a scanner, or may be image output apparatuses, such as a printer, copying machine, or a projector. Also, the TX 100 may be a smartphone. In this case, the RX 200 may be another smartphone or a wireless earphone. Also, the RX 200 may be a vehicle such as an automobile, and the TX 100 may be a charging stand placed on the console or the like of the automobile.

In the present system, wireless power transmission is performed using an electromagnetic induction method for wireless charging on the basis of the WPC standard. In other words, for the RX 200 and the TX 100, wireless power transmission is performed between a power receiving antenna of the RX 200 and a power transmitting antenna of the TX 100 to perform a wireless charge based on the WPC standard. Note that the wireless power transmission system used in the present system is not limited to that defined in the WPC standard, and other systems may be used, such as other electromagnetic induction systems, magnetic field resonance systems, electric field resonance systems, microwave systems, lasers, and the like. Also, in the present embodiment, the wireless charging uses wireless power transmission. However, wireless power transmission may be used for a different purpose other than for wireless charging.

In the WPC standard, the magnitude of the power guaranteed when power is received by the RX 200 from the TX 100 is defined as a value called Guaranteed Power (hereinafter, referred to as GP). GP represents the power value of the guaranteed output to the load (for example, a circuit for charging) of the RX 200 even when the power transmitting efficiency between the power receiving antenna and the power transmitting antenna decreases due to the positional relationship between the RX 200 and the TX 100 changing, for example. For example, in a case where the GP is 5 watts, even when the positional relationship between the power receiving antenna and the power transmitting antenna changes and the power transmitting efficiency is reduced, the TX 100 controls the power transmission in a manner such that 5 watts is output to the load in the RX 200.

Also, in the WPC standard, the method by which the TX 100 detects whether an object (foreign object) that is not the intended power transmission target exists near in the power transmitting antenna is specified. The methods specifically specified are a power loss method in which a foreign object is detected using the difference between the transmission power of the TX 100 and the received power of the RX 200 and a Q-factor measurement method in which a foreign object is detected using the change in the quality coefficient (Q-factor) of the power transmitting coil of the TX 100. Foreign object detection using the power loss method is performed during power transmission (in a Power Transfer phase described below). Also, foreign object detection using the Q-factor measurement method is performed before power transmission (in a Negotiation phase or Renegotiation phase described below).

Also, The RX 200 and the TX 100 according to the present embodiment communicate to perform power transmission and reception control based on the WPC standard. The WPC standard defines a plurality of phases including a Power Transfer phase in which power is transmitted and one or more phases before actual power transmission. In these phases, communication is executed to control the transmitting and receiving of power as necessary. Pre-power transmission phases may include a Selection phase, a Ping phase, an Identification and Configuration phase, a Negotiation phase, and a Calibration phase. Note that hereinafter, the Identification and Configuration phase will be referred to as the I&C phase.

In the Selection phase, the TX 100 intermittently transmits an Analog Ping and detects if an object is placed on the charging stand (for example, if the RX 200, conductor piece, or the like is placed on the charging stand) of the TX 100. The TX 100 detects at least a voltage value or a current value of a power transmitting antenna when the Analog Ping is transmitted, determines that an object exists in the case in which the voltage value is less than a threshold or the current value is greater than a threshold, and transitions to the Ping phase.

In the Ping phase, the TX 100 transmits a Digital Ping at a greater power than the Analog Ping. The power of the Digital Ping is sufficient enough to activate a control unit of the RX 200 placed on the charging stand of the TX 100. The RX 200 notifies the TX 100 of the magnitude of the received voltage. In this manner, by receiving a reply from the RX 200 that received the Digital Ping, the TX 100 recognizes that the object detected in the Selection phase is the RX 200. When the TX 100 receives a notification of the received voltage value, the process transitions to the I&C phase.

In the I&C phase, the TX 100 identifies the RX 200 and acquires device configuration information (capability information) from the RX 200. Accordingly, the RX 200 transmits an ID packet and a Configuration packet to the TX 100. The ID packet includes the identification information of the RX 200, and the Configuration packet includes the device configuration information (capability information) of the RX 200. The TX 100 having received the ID packet and the Configuration packet replies with an acknowledge (ACK, affirmative reply). Then, the I&C phase ends.

In the Negotiation phase, the GP value is determined on the basis of the GP value requested by the RX 200, the power transmission capability of the TX 100, and the like. Also, the TX 100 executes foreign object detection processing using the Q-factor measurement method in accordance with the request from the RX 200. Also, in the WPC standard, a method is specified in which, after the Power Transfer phase has been transitioned to, a similar processing to the Negotiation phase is again executed at the request of the RX 200. The phase in which this processing is executed after transitioning from the Power Transfer phase is called the Renegotiation phase.

In the Calibration phase, on the basis of the WPC standard, the RX 200 notifies the TX 100 of a predetermined received power (value of received power in a light load state/value of received power in a high load state) and requests for calibration to be executed. The TX 100 obtains the transmission power value corresponding to the received power value, calculates the power loss on the basis of the transmission power value and the received power value, and associates together and stores the calculated power loss and the transmission power. Then, the TX 100 calculates a parameter for foreign object detection processing using the power loss method on the basis of at least two sets of the transmission power and the power loss. This parameter will be described below. In this manner, the calibration process may include processing to obtain the received power, obtain the transmission power corresponding to the received power and calculate the power loss, and associate together and store the transmission power and the power loss. Also, the calibration process may include processing to calculate the parameter for foreign object detection processing executed by the TX 100 from at least two sets of the transmission power and the power loss. Note that power loss is the power lost when power is transmitted from the TX 100 to the RX 200. For example, in a case where the transmission power is 1 watt and the received power is 0.9 watt, the power loss is 0.1 watt. Note that instead of using the lost power value, the power loss ratio (for example, in this case, 10%) may be used as the power loss.

In the Power Transfer phase, control is performed to start power transmission, continue power transmission, stop power transmission due to detection of a foreign object or a full charge, and the like.

The TX 100 and the RX 200 perform communication using the same antenna (coil) used for wireless power transmission based on the WPC standard, for controlling the transmitting and receiving of power therebetween and superimposing a signal on the electromagnetic waves transmitted from the antenna. Note that the communicable range between the TX 100 and the RX 200 based on the WPC standard is roughly the same as the power-transmittal range (the range represented by the dashed line in FIG. 4) of the TX 100.

Next, the configuration of the power transmitting apparatus 100 (TX 100) and the power receiving apparatus 200 (RX 200) according to the present embodiment will be described. Note that the configuration described below is simply one example, and a part (or all parts) of the configuration described below may be replaced by other configurations with similar functions, may be omitted, or other configurations may be added in addition to the configurations described below. Furthermore, one block described in the description below may be one block divided into a plurality of blocks or may be a plurality of blocks merged as a single block. Also, for the functional blocks described below, the functions may be configured as software programs. However, a part or all parts included in each functional block may be configured as hardware.

FIG. 1 is a functional block diagram illustrating an example of the configuration of the TX 100 according to the present embodiment. The TX 100 includes a control unit 101, a power source unit 102, a power transmitting unit 103, a communication unit 104, a power transmitting antenna 105, and a memory 106. The control unit 101, the power source unit 102, the power transmitting unit 103, the communication unit 104, and the memory 106 are illustrated as separate units in FIG. 1. However, from among these, any number of the functional blocks may be mounted on the same chip.

The control unit 101, for example, controls the entire TX 100 by executing a control program stored in the memory 106. In other words, the control unit 101 controls the functional units illustrated in FIG. 1. Also, the control unit 101 executes control relating to power transmission control including communication for device authentication by the TX 100. Furthermore, the control unit 101 may execute control for executing an application other than wireless power transmission. The control unit 101, for example, includes one or more processors, such as a central processing unit (CPU), a microprocessing unit (MPU), or the like. Note that the control unit 101 may be configured as hardware dedicated to specific processing, such as an application specific integrated circuit (ASIC), or the like. Also, the control unit 101 may include an array circuit such as a field programmable gate array (FPGA) compiled so as to execute predetermined processing. The control unit 101 causes information stored during the execution of various types of processing to be stored in the memory 106. Also, the control unit 101 is capable of measuring time using a timer (not illustrated).

The power source unit 102 supplies the power to the entire TX 100 required for the control, power transmission, and communication of the TX 100 by the control unit 101. The power source unit 102, for example, is a commercial power source or a battery. Power supplied from a commercial power source is stored in the battery.

The power transmitting unit 103 converts direct current or alternating current power input from the power source unit 102 to alternating current frequency power in a frequency band used for wireless power transmission and generates electromagnetic waves for reception by the RX 200 by inputting the alternating current frequency power into the power transmitting antenna 105. For example, the power transmitting unit 103 converts DC voltage supplied by the power source unit 102 to AC voltage at a switching circuit with a half bridge or full bridge configuration using FETs. In this case, the power transmitting unit 103 includes a gate driver that controls switching the FETs on and off. Also, the power transmitting unit 103 is capable of changing the transmission power by changing these two switching circuits.

Also, the power transmitting unit 103 controls the intensity of the electromagnetic waves output by adjusting the voltage (transmission voltage) input to the power transmitting antenna 105. If the transmission voltage is increased, the intensity of electromagnetic waves is increased, and if transmission voltage is decreased, the intensity of electromagnetic waves is decreased. As described below, the power transmitting unit 103 is capable of controlling the transmission power by changing the transmission voltage in accordance with a Control Error packet (hereinafter, referred to as a CE packet) periodically transmitted from the RX 200. Note that the intensity of the output electromagnetic waves may be controlled by adjusting the current (transmission current) input to the power transmitting antenna 105 or both the transmission voltage and the transmission current. In addition, on the basis of an instruction from the control unit 101, the power transmitting unit 103 performs output control of the alternating current frequency power to start or stop power transmission from the power transmitting antenna 105. Also, the power transmitting unit 103 has the capability to supply power corresponding to outputting 15 watts (W) of power to a charging unit 206 (FIG. 2) of the RX 200 power according to the WPC standard.

The communication unit 104 performs communication with the RX 200 for power transmission control based on the WPC standard as described above. The communication unit 104 performs communication including modulating the electromagnetic waves output from the power transmitting antenna 105 and transmitting information to the RX 200. Also, the communication unit 104 demodulates the electromagnetic waves outputs from the power transmitting antenna 105 and modulated at the RX 200 to obtain the information transmitted by the RX 200. In other words, communication performed by the communication unit 104 is performed by superimposition of a signal on electromagnetic waves transmitted from the power transmitting antenna 105. Note that the communication unit 104 may perform communication with the RX 200 via a different communication method using an antenna other than the power transmitting antenna 105. For example, communication may be performed via IEEE 802.11 standard series wireless LAN (for example, Wi-Fi (registered trademark), Bluetooth (registered trademark), ZigBee, near-field communication (NFC), or the like. Also, the communication unit 104 may perform communication with the RX 200 by selectively using a plurality of communication methods.

The memory 106 may store the control program as well as the state of the TX 100 and the RX 200 (received power value and the like). For example, the state of the TX 100 may be obtained by the control unit 101, the state of the RX 200 may be obtained by a control unit 201 (FIG. 2) of the RX 200, and these may be received via the communication unit 104.

Figure 2:
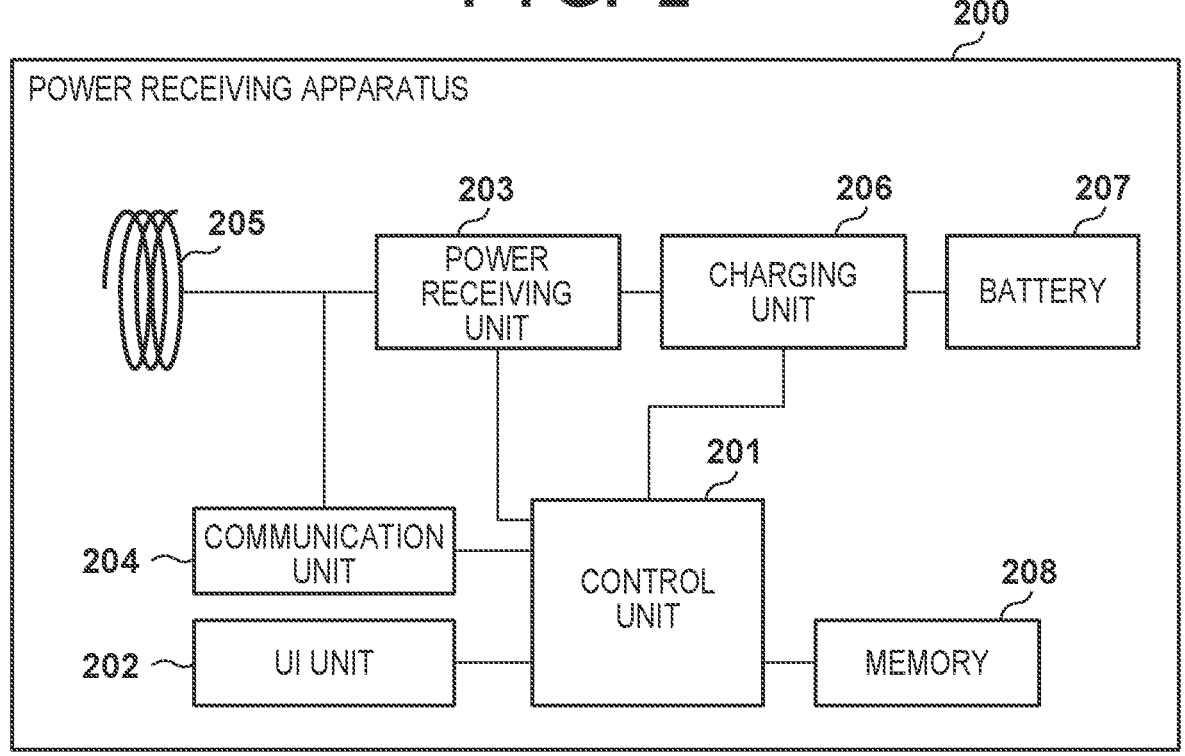
FIG. 2 is a block diagram illustrating an example configuration of a power receiving apparatus according to an embodiment.

FIG. 2 is a block diagram illustrating an example of the configuration of the power receiving apparatus 200 (RX 200) according to the present embodiment. The RX 200 includes the control unit 201, a user interface (UI) unit 202, a power receiving unit 203, a communication unit 204, a power receiving antenna 205, the charging unit 206, a battery 207, and a memory 208.

The control unit 201, for example, controls the entire RX 200 by executing a control program stored in the memory 208. In other words, the control unit 201 controls the functional units illustrated in FIG. 2. Furthermore, the control unit 201 may execute control for executing an application other than wireless power transmission. The control unit 201, for example, includes one or more processors, such as a CPU, an MPU, or the like. Note that the entire RX 200 (in a case where the RX 200 is a smart phone, the entire smart phone) may be controlled in cooperation with the operating system (OS) executed by the control unit 201. Also, the control unit 201 may be configured as hardware dedicated to a specific processing such as an ASIC. Also, the control unit 201 may include an array circuit such as an FPGA compiled so as to execute predetermined processing. The control unit 201 causes information stored during the execution of various types of processing to be stored in the memory 208. Also, the control unit 201 is capable of measuring time using a timer (not illustrated).

The UI unit 202 outputs information in various manners to the user. Herein, outputting in various manners refers to an operation such as screen display, flashing or changing the color of LEDS, audio output via a speaker, vibration of the RX 200 body, and the like. The UI unit 202 includes an LED, a speaker, a vibration motor, and/or other notification devices. Also, the UI unit 202 may have a reception function of receiving operations of the RX 200 from the user. In this case, the UI unit 202, for example, includes a button or keyboard, an audio input device such as a microphone, a motion detection device such as an acceleration sensor or gyro sensor, or another type of input device. Note that a device such as a touch panel may be used that is capable of both outputting information to the user and receiving operations from the user.

The power receiving unit 203, at the power receiving antenna 205, obtains AC power (AC voltage and AC current) generated by electromagnetic induction caused by electromagnetic waves emitted from the power transmitting antenna 105 of the TX 100. Also, the power receiving unit 203 converts the AC power to DC or AC power of a predetermined frequency and outputs the power to the charging unit 206 that executes processing to charge the battery 207. In other words, the power receiving unit 203 supplies power to a load in the RX 200. GP as described above is a power value guaranteed to be output from the power receiving unit 203. The power receiving unit 203 is capable of supplying power for the charging unit 206 to charge the battery 207 and supplying power corresponding to outputting 15 watts to the charging unit 206. Furthermore, by the power receiving unit 203 notifying the control unit 201 of the current received power value, the received power value at any discretionary time can be known by the control unit 201.

The charging unit 206 charges the battery 207 via power supplied from the power receiving unit 203. Also, the charging unit 206 starts or stops charging of the battery 207 on the basis of control from the control unit 201 and adjusts the power used to charge the battery 207 on the basis of the charge state of the battery 207. When the power used by the charging unit 206 changes, the power supplied from the power receiving unit 203, i.e., the received power at the RX 200, changes according to this change. Herein, the charging unit 206 is the load in the RX 200. Accordingly, causing the charging unit 206 to start charging the battery 207 corresponds to connecting the load to the power receiving unit 203. In a similar manner, stopping charging corresponds to disconnecting the load from the power receiving unit 203.

The communication unit 204 performs communication for power reception control based on the WPC standard as described above with the communication unit 104 of the TX 100. The communication unit 204 demodulates the electromagnetic waves received from the power receiving antenna 205 and obtains the information transmitted from the TX 100. Also, the communication unit 204 performs communications with the TX 100 by superimposing, on electromagnetic waves, a signal relating to the information to be transmitted to the TX 100 via load modulation of the received electromagnetic waves. Note that the communication unit 204 may perform communication with the TX 100 via a different communication method using an antenna other than the power receiving antenna 205. For example, communication may be performed via IEEE 802.11 standard series wireless LAN (for example, Wi-Fi (registered trademark), Bluetooth (registered trademark), ZigBee, NFC, or the like. Also, the communication unit 204 may perform communication with the TX 100 by selectively using a plurality of communication methods.

The memory 208 stores the control program as well as the state of the TX 100 and the RX 200. For example, the state of the RX 200 may be obtained by the control unit 201, the state of the TX 100 may be obtained by the control unit 101 of the TX 100, and these may be received via the communication unit 204.

Figure 3:
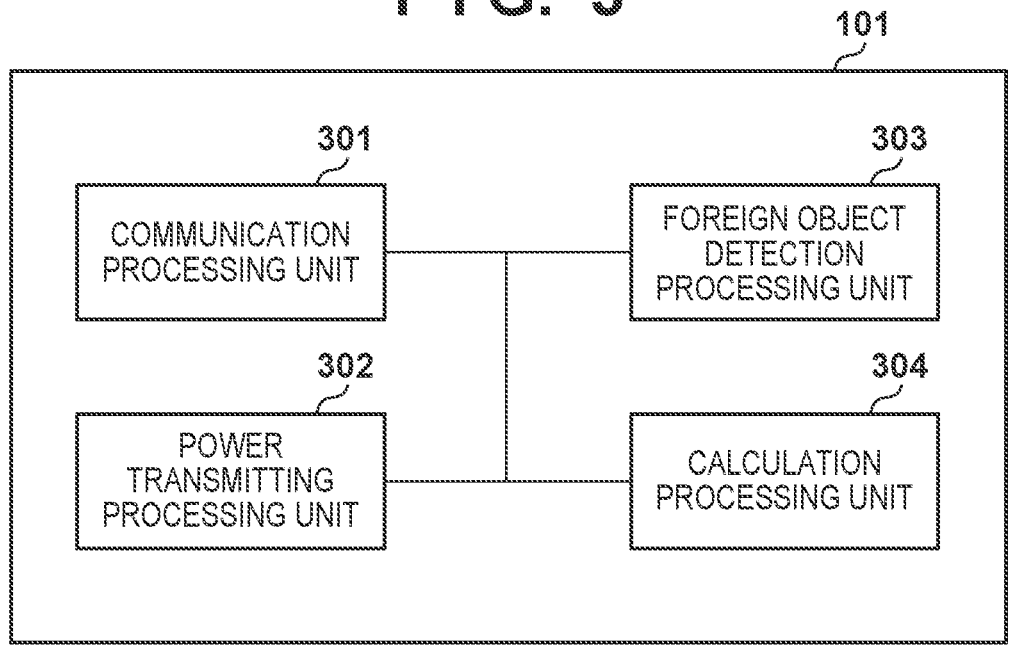
FIG. 3 is a functional block diagram of a power transmitting apparatus according to an embodiment.

Next, the functional block diagram of the control unit 101 of the TX 100 will be described next with reference to FIG. 3. The control unit 101 includes a communication processing unit 301, a power transmitting processing unit 302, a foreign object detection processing unit 303, and a calculation processing unit 304.

The communication processing unit 301 executes processing relating to the control communication with the RX 200 based on the WPC standard via the communication unit 104. The power transmitting processing unit 302 controls the power transmitting unit 103 and executes processing relating to transmitting power to the RX 200.

The foreign object detection processing unit 303 executes processing to detect a foreign object. Herein, a detected foreign object is a foreign object that exists in the power-transmittal range of the TX 100 and a foreign object placed on the placement surface (contact surface) where the RX 200 is placed. As long as a foreign object can be detected at a position that is affected when power is transmitted from the TX 100 to the RX 200, its detection range is not limited. The foreign object detection processing unit 303 may implement a foreign object detection function via the power loss method and a foreign object detection function via the Q-factor measurement method. Also, the foreign object detection processing unit 303 may execute foreign object detection processing using another method. For example, in a case where the TX 100 has an NFC communication function, foreign object detection processing may be executed using an opposing device detection function using an NFC standard.

The calculation processing unit 304 measures the power output to the RX 200 via the power transmitting unit 103 and calculates the average transmission power value per unit time. The foreign object detection processing unit 303 executes foreign object detection processing using the power loss method on the basis of the calculation result from the calculation processing unit 304 and the received power information received from the power receiving apparatus via the communication processing unit 301.

The functions of the communication processing unit 301, the power transmitting processing unit 302, the foreign object detection processing unit 303, and the calculation processing unit 304 are implemented as programs operating via the control unit 101. Each processing unit may be configured as an independent program and operate in parallel with the programs being in sync via event processing or the like.

Operations of Power Receiving Apparatus

Next, the operations of the RX 200 according to the present embodiment will be described using the flowchart of FIG. 7. The present processing can be implemented by the control unit 201 of the RX 200 executing a program read out from the memory 208, for example.

Figure 7:
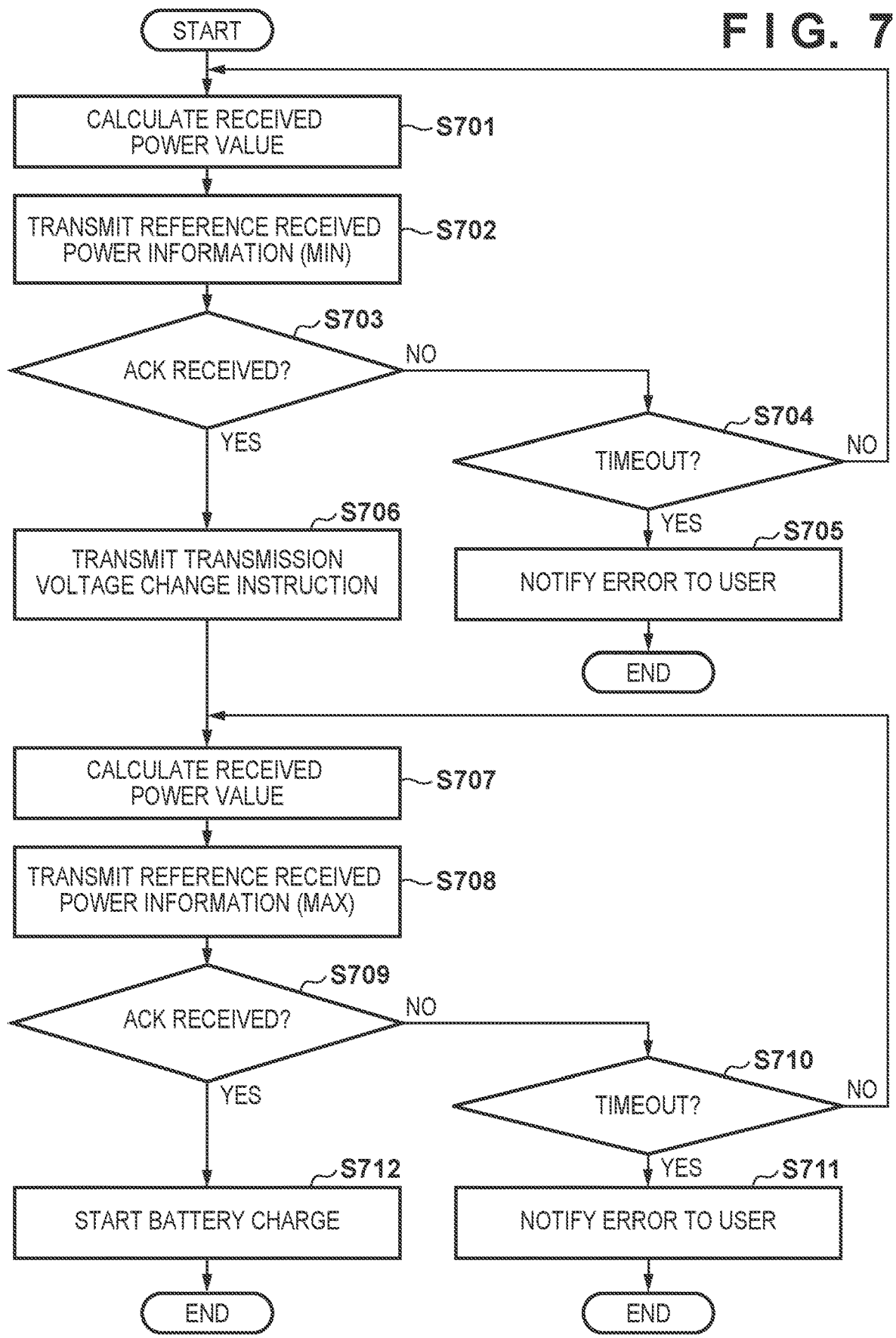
FIG. 7 is a flowchart illustrating a process executed by a power receiving apparatus.

FIG. 7 is a flowchart illustrating the processing executed by the RX 200 and illustrates the processing process for causing the TX 100 to calculate an estimation value of the power loss (hereinafter, also referred to as an estimated power loss) used in foreign object detection via the power loss method. The process in FIG. 7 is executed after the Negotiation phase is completed at the RX 200 and before the charge processing for the battery 207 is executed. Specifically, the process is started after a packet requesting negotiation completion is transmitted by the RX 200 to the TX 100 and an affirmative reply (ACK packet) is received from the TX 100.

Firstly, the RX 200 calculates the received power value in a low load (light load) state as reference received power information (step S701). Note that herein, a low load state is a state in which the power receiving unit 203 is not connected to a load, or in other words, a state in which the received power is the minimum, with the power output to the power receiving unit 203 being approximately 500 mW. Then, the RX 200 uses a Received Power packet (hereinafter, referred to as an RP packet) in accordance with the WPC standard and sends a request to the TX 100 for calibration execution (step S702). An RP packet includes the received power value at a low load state calculated as the reference power information and information corresponding to Mode=1 representing that a first item of calibration will be performed.

Note that though not illustrated, the RX 200 periodically transmits a CE packet for control of the transmission voltage (transmission power) of the TX 100 after the Negotiation phase is complete. For example, the CE packet corresponds to an instruction, such as +1 volt, −2 volt, 0 (maintain voltage), or the like. When calibration is performed, the CE packet is used for requesting fine adjustment of the transmission power to maintain the received power at a constant value (for example 500 mW).

When the RX 200 receives a NAK packet in response to the calibration request from the TX 100 (no in step S703), the time from when the RP packet was first received in step S702 is calculated, and whether or not time has run out is checked (step S704). In the case of time out (yes in step S704), the RX 200 notifies the user that an error has occurred (step S705), and charge processing ends. In a case where the time has not run out (no in step S704), again, the RX 200 calculates the received power value (step S701) and transmits an RP packet (step S702).

When an ACK packet is received in response to the calibration request from the TX 100 (yes in step S703), the RX 200 instructs the TX 100 to raise the transmission voltage via a CE packet in order to calculate the received power value in a high load state (step S706). Note that herein, a high load state is a state in which the power receiving unit 203 is connected to a load and the received power is the maximum, with the power output to the power receiving unit 203 being approximately 15 W, which is roughly the maximum power in the range according to the WPC standard. Note that when the received power is at the maximum, the maximum power capable of being supplied to the load by the RX 200, the maximum power estimated to be required at the load in the time period from placement to charge completion, or a power based on the GP is set. The RX 200 may transmit a CE packet many times to measure the power output to the power receiving unit 203 and adjust output so that the output is approximately 15 W. The TX 100 may be configured to transmit a large power by switching the switching circuits when these CE packets are received.

After CE packet transmission, in a case where the received power is confirmed to has risen to approximately 15 W, in a similar manner to with the low load state, the RX 200 calculates the received power value as the reference received power information (step S707) and sends a request for calibration using an RP packet (step S708). Herein, a transmitted RP packet includes the received power value at a high load state and information corresponding to Mode=2 representing that a second item of calibration will be performed.

When the RX 200 receives a NAK packet in response to the second item of calibration request from the TX 100 (no in step S709), the time from when the RP packet was received in step S708 is calculated, and whether or not time has run out is checked (step S710). In the case of time out (yes in step S710), the RX 200 notifies the user that an error has occurred (step S711), and charge processing ends. In a case where the time has not run out (no in step S710), again, the RX 200 calculates the received power value (step S707) and transmits an RP packet (step S708).

When the RX 200 receives an ACK packet in response to the second item of calibration request from the TX 100 (yes in step S709), processing to charge the battery 207 starts (step S712). Note that after the second item of calibration is complete, the RX 200 periodically notifies the TX 100 of its own received power value via an RP packet. Thus, the RP packet transmitted in a case where there is no request for calibration execution includes the information corresponding to Mode=0. As described below, the TX 100 uses the received power value included in the RP packet in which Mode=0 received from the RX 200 and detects foreign objects via the power loss method.

Operations of Power Transmitting Apparatus

Next, the operations of the TX 100 according to the present embodiment will be described using the flowchart of FIGS. 5 and 6. The present processing can be implemented by the control unit 101 of the TX 100 executing a program read out from the memory 106, for example.

Figure 5:
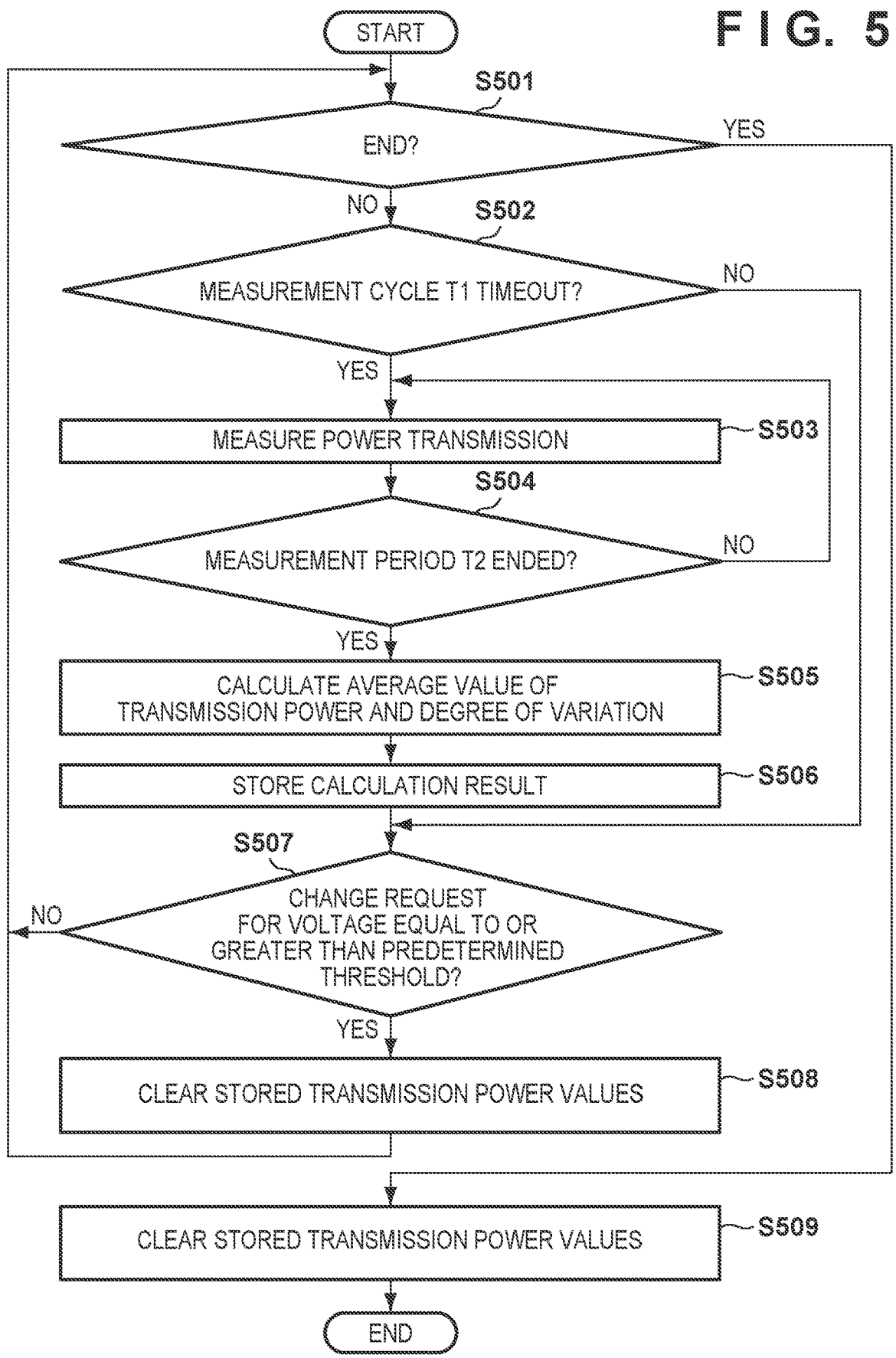
FIG. 5 is a flowchart illustrating a process executed by a power transmitting apparatus.
Figure 6A:
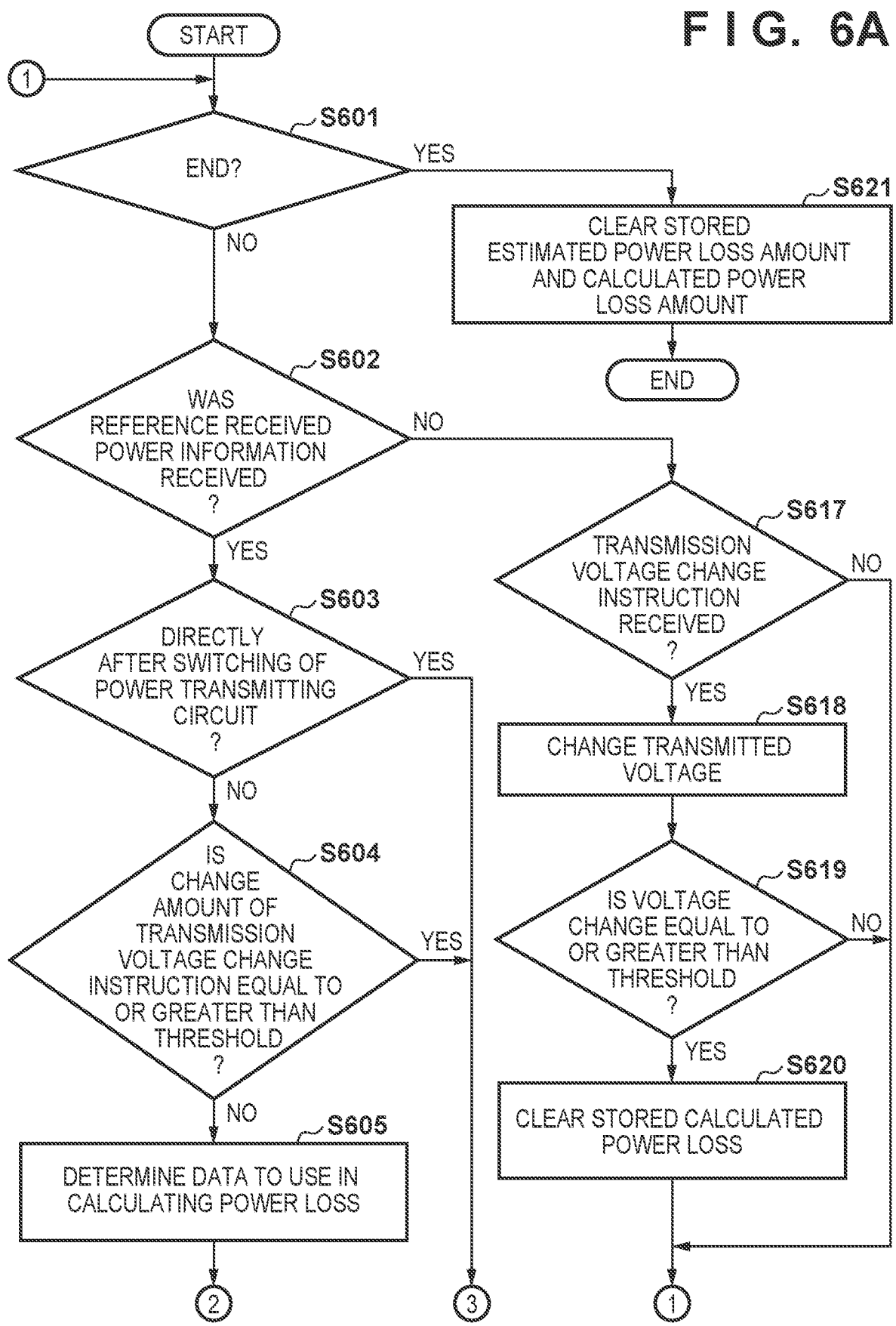
FIG. 6A is a flowchart (1) illustrating a process executed by a power transmitting apparatus.
Figure 6B:
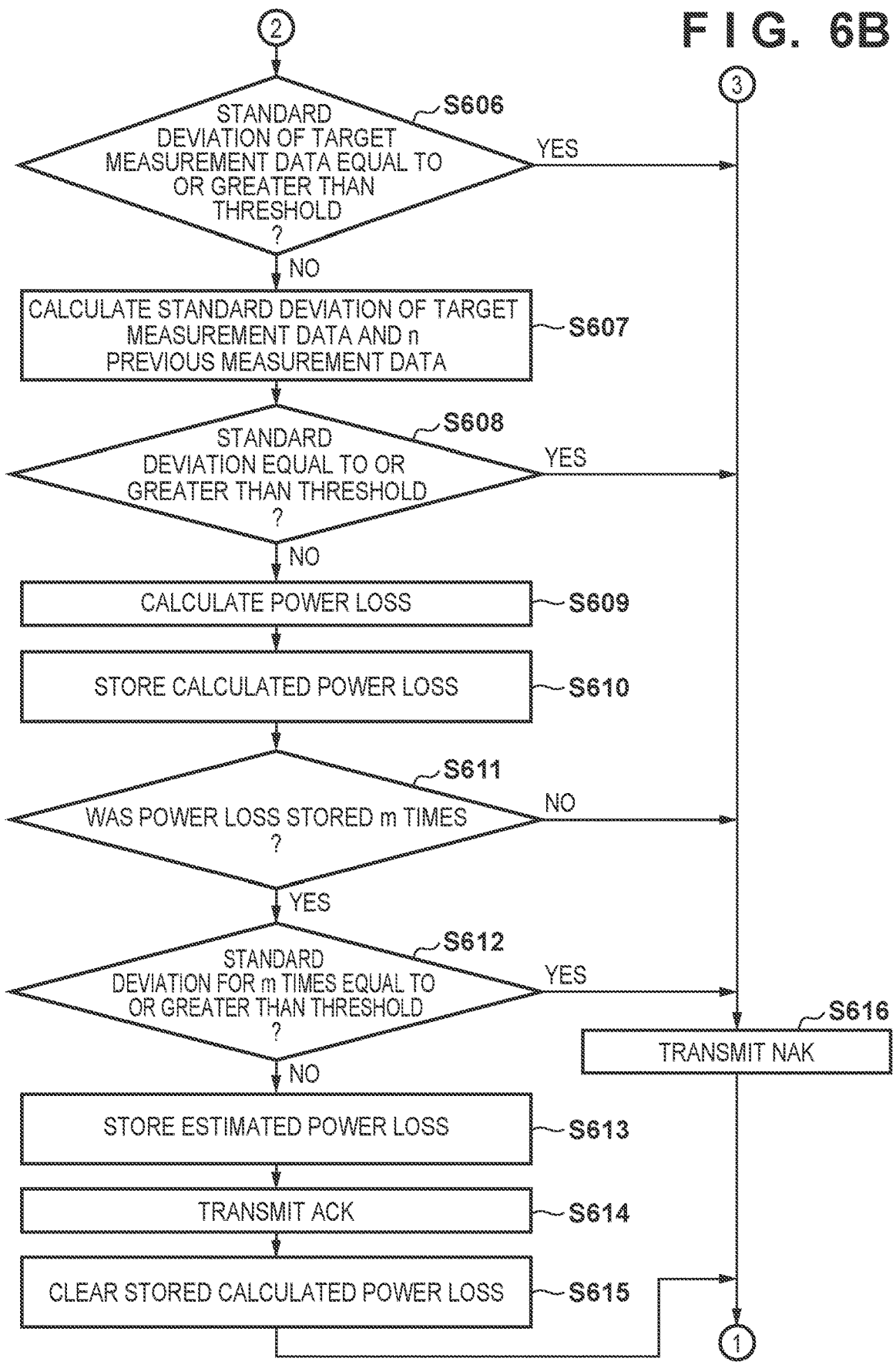
FIG. 6B is a flowchart (2) illustrating a process executed by a power transmitting apparatus.

FIG. 5 is a flowchart illustrating the processing operations of the calculation processing unit 304 operating in the control unit 101 and illustrating the processing process for calculating and storing the transmission power when the TX 100 transmits power to the RX 200. FIGS. 6A and 6B are flowcharts illustrating the processing operations of the processing units operating in the control unit 101 and illustrating the processing process for calculating the estimated power loss using the foreign object detection processing via the power loss method by the TX 100. The processes in FIGS. 5, 6A, and 6B are executed when the Negotiation phase described above is completed by the TX 100. Specifically, the processes are started after the TX 100 receives a packet requesting negotiation completion from the RX 200 and an affirmative reply (ACK packet) is transmitted to the RX 200. Also, the processes in FIGS. 5, 6A, and 6B operate independently and in parallel.

Firstly, the processing for measuring and storing the transmission power in FIG. 5 will be described in detail.

The process from step S502 to step S508 is continuously executed after the Negotiation phase is completed by the TX 100 until the processing for transmitting power to the RX 200 is complete (yes in step S501). Specifically, the process is repeatedly executed until the communication processing unit 301 receives an End Power Transfer packet (hereinafter, referred to as an EPT packet) from the RX 200 or the power transmitting process is unable to be continued due to an abnormality in the environment such as an increase in the temperature.

The calculation processing unit 304 of the TX 100 measures the transmission power value in a measurement period T2 (no in step S504) for each measurement cycle T1 (yes in step S502) (step S503). Herein, the relationship between the measurement cycle T1 and the measurement period T2 will be described using FIG. 12.

Figure 12:
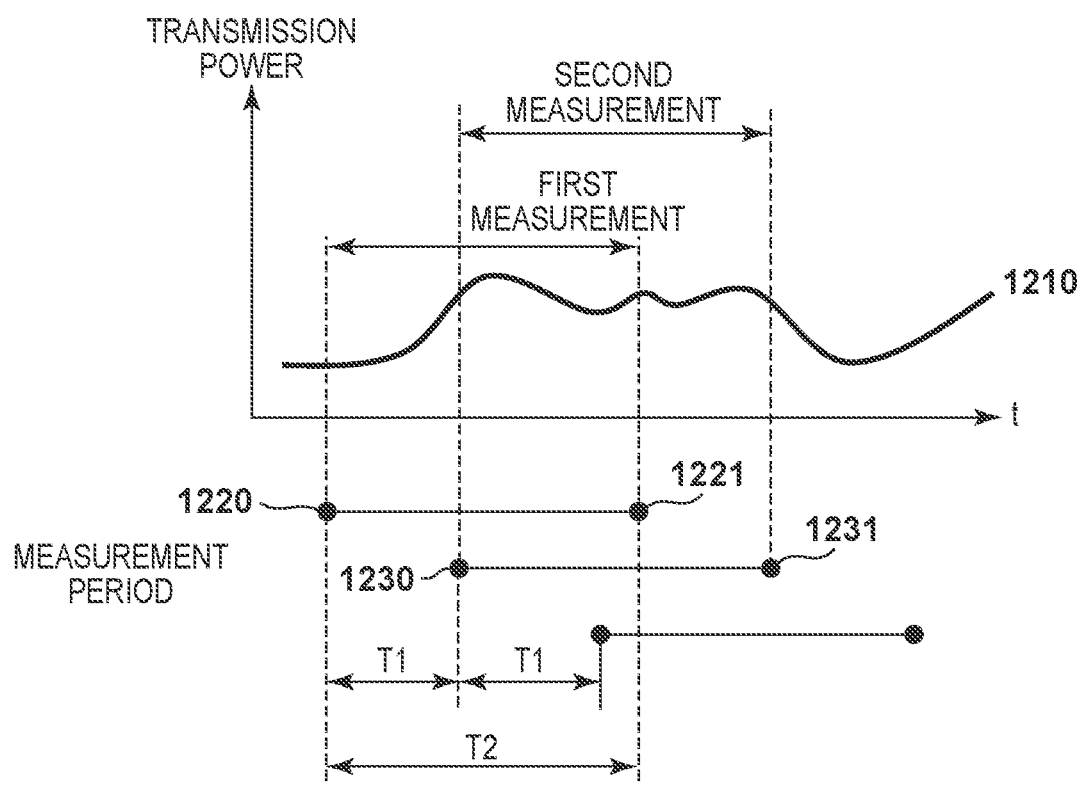
FIG. 12 is a diagram illustrating the relationship between a measurement cycle and a measurement period in transmission power measurement processing in a power transmitting apparatus.

In the diagram illustrated in FIG. 12, the horizontal axis represents time, the vertical axis represents the transmission power by the TX 100, and a curved line 1210 represents the measurement value of the actual transmission power. The straight line at the bottom of the diagram represents the measurement period T2 (the time period during which step S503 is executed) of the transmission power value for the calculation processing unit 304.

1220 represents the time at which the first measurement starts (the timing of the transition to yes in step S502), and 1221 represents the time at which the first measurement ends (the timing of the transition to yes in step S504). 1230 represents the time at which the second measurement starts, and 1231 represents the time at which the second measurement ends. Herein, the time interval from 1220 to 1221 and the time interval from 1230 to 1231 corresponds to the measurement period T2, and the time interval from 1220 to 1230 corresponds to the measurement cycle T1. As illustrated in FIG. 12, by setting the relationship between the measurement cycle T1 and the measurement period T2 to T1<T2, the calculation processing unit 304 executes a plurality of processes in parallel to measure the transmission power at offset timings. In the present embodiment, T1 is 3 msec and T2 is 8 msec. Note that the relationship may be set to T1≥T2. In this manner, the TX 100 periodically measures the transmission power value. Accordingly, regardless of when the received power value is reported by the RX 200 as described below, the transmission power value corresponding to the received power value can be derived.

Returning to the description of FIG. 5, when the measurement period T2 elapses (yes in step S504), the calculation processing unit 304 calculates the average value of the transmission power values measured in T2 and the standard deviation as information representing the degree of variation in the transmission power values (step S505). Also, the calculation processing unit 304 associates together the calculated average value (hereinafter, also referred to as the average transmission power value) of the transmission power values and the standard deviation and stores these as transmission power data in the memory 106 (step S506). Note that in this example the standard deviation is used as information representing the degree of variation in the transmission power values. However, for example, the distribution or the difference between the maximum value and the minimum value may be used as the information representing the degree of variation. Also, the calculation processing unit 304 stores the pieces of transmission power data calculated in step S505 in the memory 106 in order based on the measuring time. The stored data is managed as a ring buffer, and, in a case where the maximum storage number of the buffer is exceeded, the old data is overwritten with the new.

The calculation processing unit 304 determines whether or not there is a change request for a transmission voltage equal to or greater than a predetermined threshold using a CE packet transmitted from the RX 200 (step S507). Here, there are cases in which a change request for a transmission voltage equal to or greater than the threshold, one example being a case where, in step S706, a CE packet is transmitted from the RX 200. In this case, because the first item of calibration (calculation of the estimated power loss) is complete and the transmission power value prior to the transmission voltage change is not required, the transmission power data stored in step S506 is deleted (step S508). In another case, while the first item of calibration is being executed, it is plausible that the received power is made unstable due to the effects of misalignment of the RX 200 and the like and the amount of change in the voltage specified by the CE packet periodically transmitted from the RX 200 is increased. This may also occur while the second item of calibration is being executed, and in this case, the measurement of the transmission power is required to be redone. This makes the measurement results up until this point unnecessary, and the stored transmission power data is deleted in step S508.

In a case where, in step S507, there is not a change request for a transmission voltage of equal to or greater than the threshold or in a case where the transmission power data stored in the memory 106 is deleted in step S508, the process returns to step S501. Also, in a similar manner as to when the processing to transmit power to the RX 200 is complete (yes in step S501), the calculation processing unit 304 deletes the transmission power data stored in the memory 106 in step S506 (step S509). By the data being deleted in steps S508 and S509, the amount of data stored in the memory 106 can be reduced, and, even with a hardware configuration in which the memory 106 has a small capacity, the processing of the present embodiment can be executed.

In this manner, in the present embodiment, the TX 100 regularly executes processing to measure and calculate the transmission power. Thus, in the processes in FIGS. 6A, 6B, and 11 described below, when the received power value is obtained from the RX 200, the transmission power value corresponding to the received power value can be identified.

Next, the processing to calculate the estimated power loss will be described in detail using FIGS. 6A and 6B.

The process from step S602 to step S620 is continuously executed after the Negotiation phase is completed by the TX 100 until the processing for transmitting power to the RX 200 is complete (yes in step S601).

In this process, the communication processing unit 301 of the TX 100 waits to receive an RP packet (Mode=1 or 2) as the reference received power information transmitted from the RX 200 in step S702 or step S708 in FIG. 7 and a CE packet as a transmission voltage change instruction.

In a case where the communication processing unit 301 receives an RP packet, in other words when a calibration request is received (yes in step S602), the foreign object detection processing unit 303 checks the amount of time elapsed from when the switching circuit of the power transmitting unit 103 was last switched (step S603). In a case where the predetermined amount of time has not elapsed from when the switching circuit was switched (yes in step S603), the TX 100 determines that the transmission power output is not stable, and the communication processing unit 301 transmits a NAK packet to the RX 200 (step S616).

In a case where the predetermined amount of time has elapsed from when the switching circuit was switched (no in step S603), the foreign object detection processing unit 303 checks the change amount of the voltage requested by the CE packet most recently received from the RX 200 (step S604). In a case where the change amount is equal to or greater than a predetermined threshold (yes in step S604), the TX 100 determines that the received power at the RX 200 is not stable, and the communication processing unit 301 transmits a NAK packet to the RX 200 (step S616). In a case where the change amount is less than a predetermined threshold (no in step S604), the TX 100 determines that the received power at the RX 200 is stable. Note that the value checked in step S604 may be determined on the basis of the value specified in most recent of the received plurality of CE packets. For example, in a case where the total change amount specified by the plurality of CE packets is equal to or greater than the threshold, the TX 100 may determine that the received power at the RX 200 is stable, and in a case where the total change amount is less than the threshold, the TX 100 may determine that the received power is not stable. Also, in a case where not one of the specified values (voltage change amount) of the CE packet received most recently a plurality of times is greater than the threshold, the TX 100 may determine that the received power at the RX 200 is stable, and in a case where even one is greater than the threshold, the TX 100 may determine that the received power is not stable.

In a case where the received power at the RX 200 is determined to be stable (no in step S604), the foreign object detection processing unit 303 determines, from the transmission power data (the average value for the transmission power values and the standard deviation) stored in step S506 by the calculation processing unit 304, the data to use in calculating the power loss (step S605). Specifically, the transmission power data with the calculation completion time closest to the time back by an amount of time T3 from a point in time at which the RP packet was received is used. Herein, T3 is a value calculated to be the time from when calculating the received power at the RX 200 is completed to when the TX 100 is notified of the value via an RP packet. In the present embodiment, T3 is 8 msec.

In a case where the standard deviation of the transmission power values included in the transmission power data determined in step S605 is equal to or greater than the threshold (yes in step S606), the TX 100 determines that the transmission power is unstable, and the communication processing unit 301 transmits an NAK packet to the RX 200 (step S616). In a case where the standard deviation included in the transmission power data determined in step S605 is less than the threshold (no in step S606), the foreign object detection processing unit 303 calculates the standard deviation of the average transmission power value used in step S605 and n average transmission power values calculated before calculation of the data (step S607). Note that herein, n is a predetermined integer value of one or greater and is a value equal to or less than the buffer number of the ring buffer where the transmission power data described above is stored. In the present embodiment, n is 5.

In a case where the standard deviation calculated in step S607 is equal to or greater than the threshold (yes in step S608), the TX 100 determines that the transmission power is unstable, and the communication processing unit 301 transmits an NAK packet to the RX 200 (step S616). Also, in a case where the standard deviation calculated in step S607 is less than the threshold (no in step S608), the TX 100 determines that the transmission power is stable. Note that the value calculated and checked in steps S607 and S608 does not need to be a standard deviation. For example, the TX 100 may calculate the distribution, the difference value between the maximum value and the minimum value, and the total change amount for the calculated value each time and may determine that the transmission power is unstable if each value is equal to or greater than the threshold and determine that the transmission power is stable if each value is less than the threshold. Also, in a case where, for the average transmission power value of the transmission power data used in step S605 and the average transmission power values of n transmission power data calculated before data calculation, not even one is greater than the threshold, the transmission power may be determined to be stable, and in a case where even one is greater than the threshold, the transmission power may be determined to be unstable.

In a case where the TX 100 determines that the transmission power is stable (no in step S608), the foreign object detection processing unit 303 calculates the power loss lost between the TX 100 and the RX 200 (step S609). Specifically, a value obtained by subtracting the received power value included in the RP packet received in step S602 from the average transmission power value included in the transmission power data used in step S605 corresponds to the power loss. Next, the foreign object detection processing unit 303 associates the calculated power loss with the average transmission power value used in step S605 and stores it in the memory 106 (step S610).

Here, the TX 100 determines whether or not the power loss for m times or more are stored. In a case where m times or more are not stored (no in step S611), because there is a possibility that the power transmitting state between the TX 100 and the RX 200 is unstable, the communication processing unit 301 transmits a NAK packet to the RX 200 (step S616). Herein, m is a predetermined integer value of two or greater, and in the present embodiment, m is three.

In a case where the power loss is stored m times or greater (yes in step S611), the foreign object detection processing unit 303 calculates the standard deviation of the power loss calculated for the most recent m times (step S612). As in the process from step S606 to step S608, because the transmission power by the TX 100 is table, in a case where the standard deviation of the power loss is great, there may be variation in the received power at the RX 200. This is thought to be caused by a problem in the RX 200 itself or caused by some kind of change in the power transmitting state (power transmitting environment) between the TX 100 and the RX 200. In a case where the standard deviation is equal to or greater than the threshold (yes in step S612), the received power by the RX 200 or the power transmitting state between the TX 100 and the RX 200 is determined to be unstable, and the communication processing unit 301 transmits a NAK packet to the RX 200 (step S616).

In a case where the standard deviation is less than the threshold (no in step S612), the power transmitting state between the TX 100 and the RX 200 is determined to be stable, and the foreign object detection processing unit 303 stores the estimated power loss in the memory 106 (step S613). Specifically, the average value for the average transmission power value (Avtp) and for the power loss (Avloss) is calculated for the most recent m times stored in the memory 106, and the estimated power loss when the transmission power is Avtp is stored as the Avloss.

Note that the value calculated and checked in step S612 does not need to be a standard deviation. For example, the TX 100 may calculate the distribution, the difference value between the maximum value and the minimum value, and the total change amount for the calculated value each time and may determine that the power transmitting state with the RX 200 is unstable if each value is equal to or greater than the threshold and determine that the power transmitting state is stable if each value is less than the threshold. Also, in a case where the power loss calculated for the most recent m times is not once greater than the threshold, the TX 100 may determine that the power transmitting state with the RX 200 is stable, and in a case where the power loss is even once greater than the threshold, the TX 100 may determine that the power transmitting state is unstable. Also, in the example described above, in step S612, whether or not the power transmitting state is stable is determined on the basis of the calculated standard deviation of the power loss and the like. However, this may be determined on the basis of an obtained standard deviation of the received power.

Thereafter, the communication processing unit 301 transmits an ACK packet to the RX 200 (step S614). Also, the foreign object detection processing unit 303 clears the unnecessary information including the power loss and the average transmission power value stored in the memory 106 in step S610 (step S615), and the process returns to step S601.

When the communication processing unit 301 receives a CE packet (yes in step S617), the power transmitting processing unit 302 changes the voltage applied to the power transmitting unit 103 in accordance with the value instructed by the CE packet (step S618). In a case where the change amount of the voltage instructed by the CE packet is equal to or greater than a predetermined threshold (yes in step S619), the received power at the RX 200 is unstable and calibration needs to be performed again. Then, the foreign object detection processing unit 303 clears the information including the power loss and the average transmission power value stored in the memory 106 in step S610 (step S620).

When the processing for transmitting power from the TX 100 to the RX 200 is complete (yes in step S601), the foreign object detection processing unit 303 clears the information including the power loss and the average transmission power value stored in the memory 106 in step S610 and the estimated power loss information stored in step S613 (step S621).

Accordingly, in the present embodiment, in a case where the TX 100 receives a calibration request from the RX 200, whether or not the state is one in which the estimated power loss is stable and measurement can be performed is checked. Specifically, whether the transmission power at the TX 100 is stable, whether the received power at the RX 200 is stable, and the like is checked. Also, when the state is one in which there is instability and measurement cannot be performed, the TX 100 replies with a NAK, and when the state changes to one in which there is stability and measurement can be performed, the estimated power loss is stored and the TX 100 replies with an ACK. Accordingly, the estimated power loss can be calculated with high accuracy, and the foreign object detection accuracy can be improved.

Next, the foreign object detection processing operations using the power loss method with the TX 100 of the present embodiment will be described using FIGS. 10 and 11.

Figure 10:
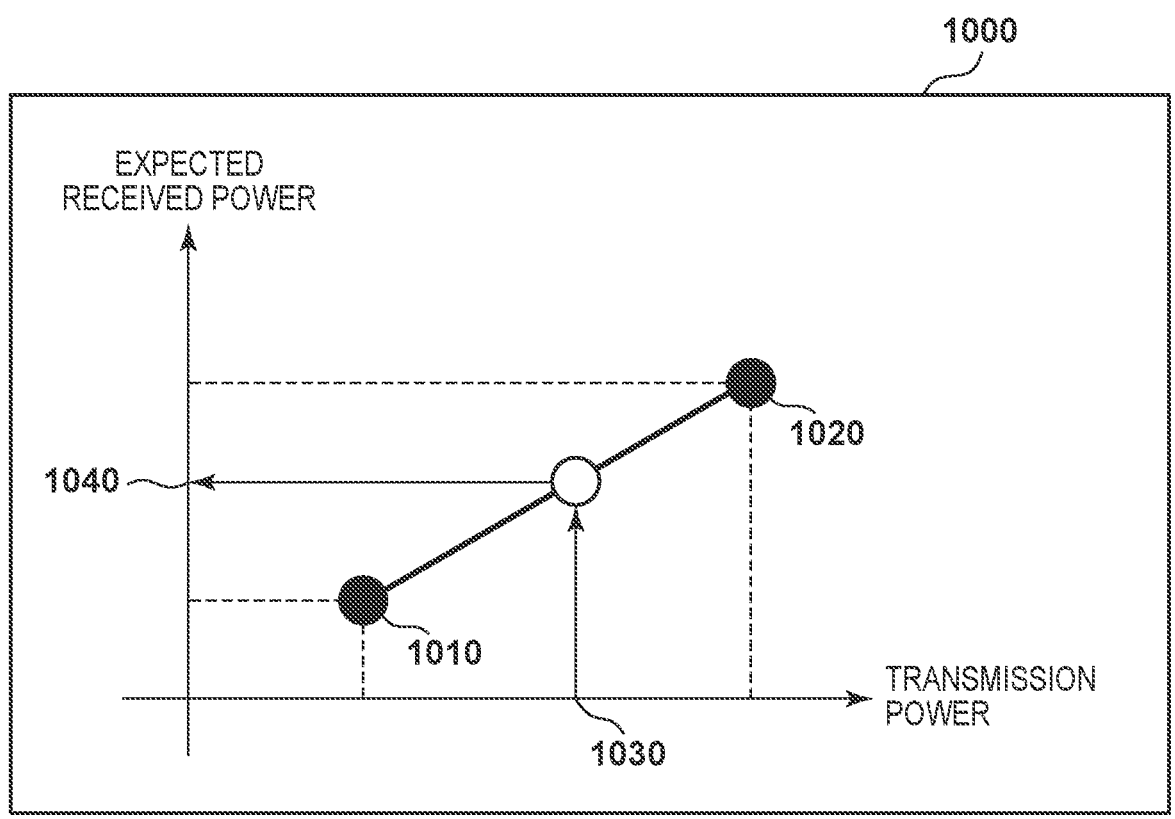
FIG. 10 is a diagram illustrating an expected received power graph generated by a power transmitting apparatus.

FIG. 10 is a graph illustrating an expected received power graph 1000 generated by the TX 100. The expected received power graph 1000 is a graph on which is plotted the expected received power (horizontal axis) against the transmission power (vertical axis) when power is transmitted from the TX 100 to the RX 200 in a state where a foreign object is not present. The graph is generated by the calculation processing unit 304 on the basis of the transmission power value Avtp and the estimated power loss Avloss stored in the memory 106 in step S613 in FIG. 6B described above.

1010 and 1020 are plotted points based on the transmission power output Avtp and the estimated power loss Avloss, respectively, stored in step S613, with the values on the horizontal axis corresponding to the Avtp and the values on the vertical axis corresponding to Avtp−Avloss. In other words, 1010 is a point plotted on the basis of a calibration result in a low load state as described above, and 1020 is a point plotted on the basis of a calibration result in a high load state. The calculation processing unit 304 performs linear interpolation of the area between the measurement points plotted in step S613, and a calculation formula (graph) for obtaining an Avrp value with respect to a specific Avtp value is generated. In the present embodiment, the gradient and the intercept of the linear function represented by the graph corresponds to the parameters for the foreign object detection processing described above.

The calculation processing unit 304 continuously measures its own transmission power (1030) and calculates the corresponding expected received power value (1040). In a case where the difference between the received power value and the expected received power value reported by the RX 200 is equal to or greater than a predetermined threshold, the TX 100 determines that a foreign object exists near (in the power transmitting range) of the power transmitting antenna 105.

Note that the method of generating the graph is not limited to the method of performing linear interpolation of the space between the measurement points and it is only required that a graph for obtaining one Avrp value with respect to one Avtp value is derived. For example, calibration may be performed for not only the two points described above, and the graph may be generated by performing linear interpolation of the space between three or more measurement points. Also, in a case where there are three or more measurement points, the graph may be generated using an approximation curve.

Figure 11:
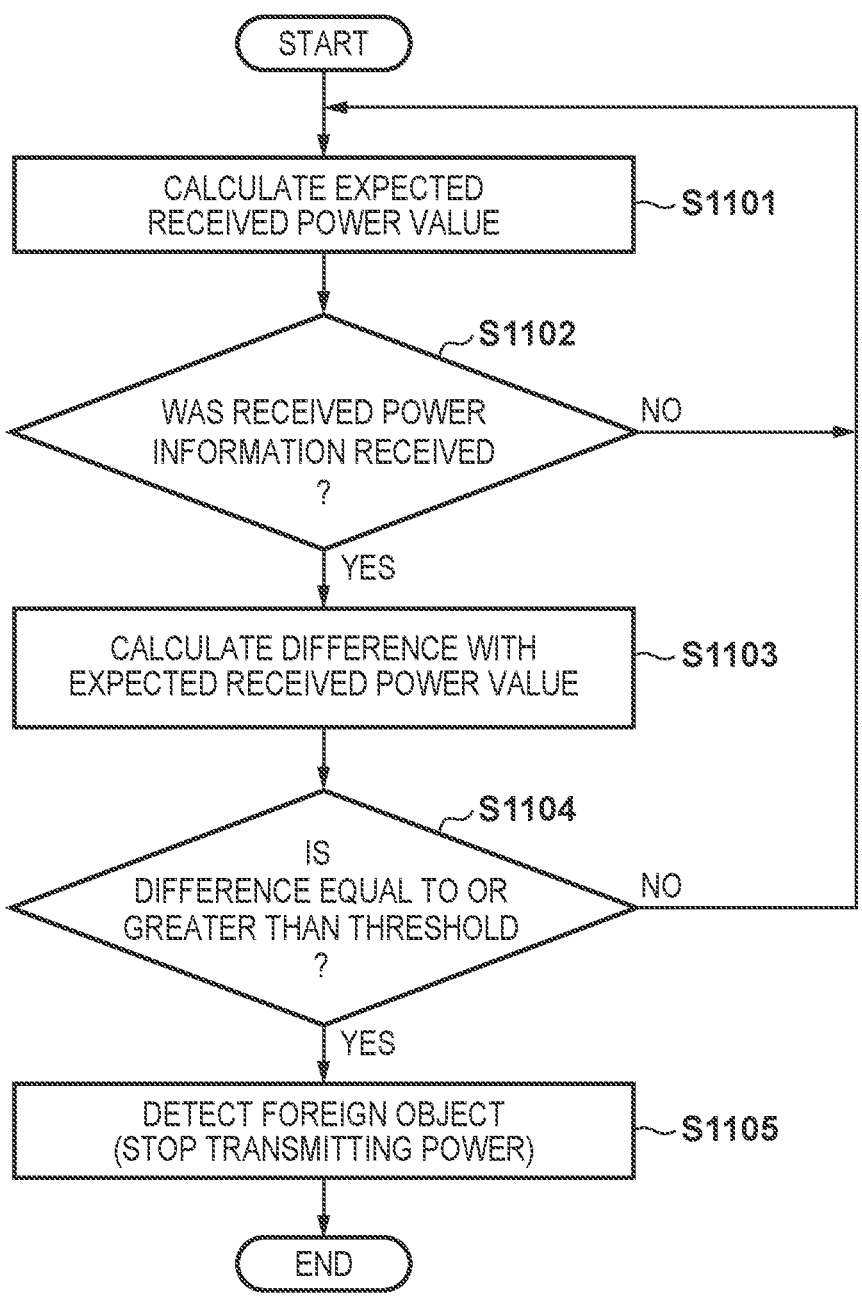
FIG. 11 is a flowchart illustrating foreign object detection processing executed by a power transmitting apparatus.

FIG. 11 is a flowchart of when foreign object detection processing is executed using the expected received power graph 1000 with the TX 100. The process in FIG. 11 is continuously executed after the process in FIGS. 6A and 6B are executed and while the TX 100 is in a Power Transfer phase. The present processing can be implemented by the control unit 101 of the TX 100 executing a program read out from the memory 106, for example.

The calculation processing unit 304 of the TX 100 continuously calculates the expected received power value at the RX 200 with respect to its transmission power in accordance with the expected received power graph 1000 (step S1101).

As described above, the RX 200 periodically notifies the TX 100 of its received power value via an RP packet (Mode=0) after the second item of calibration is complete. When the communication processing unit 301 receives the RP packet from the RX 200 (yes in step S1102), the calculation processing unit 304 calculates the difference between the expected received power value obtained in step S1101 and the received power value received via the RP packet (step S1103).

In a case where the difference obtained in step S1103 is equal to or greater than a threshold (yes in step S1104), the TX 100 determines that a foreign object has been detected, the power transmitting process with respect to the RX 200 is stopped, and a Selection phase is transitioned to (step S1105). Also, in a case where the difference obtained in step S1103 is less than the threshold (no in step S1104), the TX 100 stops in the Power Transfer phase and continues the power transmitting process. Note that the threshold used in the determination in step S1104 may be a single fixed value or may be a value determined according to a measurement value that dynamically changes, such as the transmission power value, temperature, or the like.

Also, in the example described above, in step S1101, the expected received power value at the RX 200 with respect to the transmission power is continuously calculated. However, in step S1102 when a Mode=0 RP packet is received, the corresponding transmission power may be obtained. Specifically, as in step S605 in FIG. 6A, the transmission power value with the calculation completion time closest to the time back by an amount of time T3 from a point in time at which the RP packet was received may be used.

Wireless Power Transmission System Sequence

Next, a sequence of a wireless power transmission system including the TX 100 and the RX 200 will be described with reference to FIGS. 8A and 8B and 9A and 9B. FIGS. 8A and 8B and 9A and 9B are diagrams illustrating an example of a communication sequence until the calibration between the TX 100 and the RX 200 is completed when the RX 200 is placed on the TX 100 with the RX 200 set to execute a charging function according to the WPC.

Figure 8A:
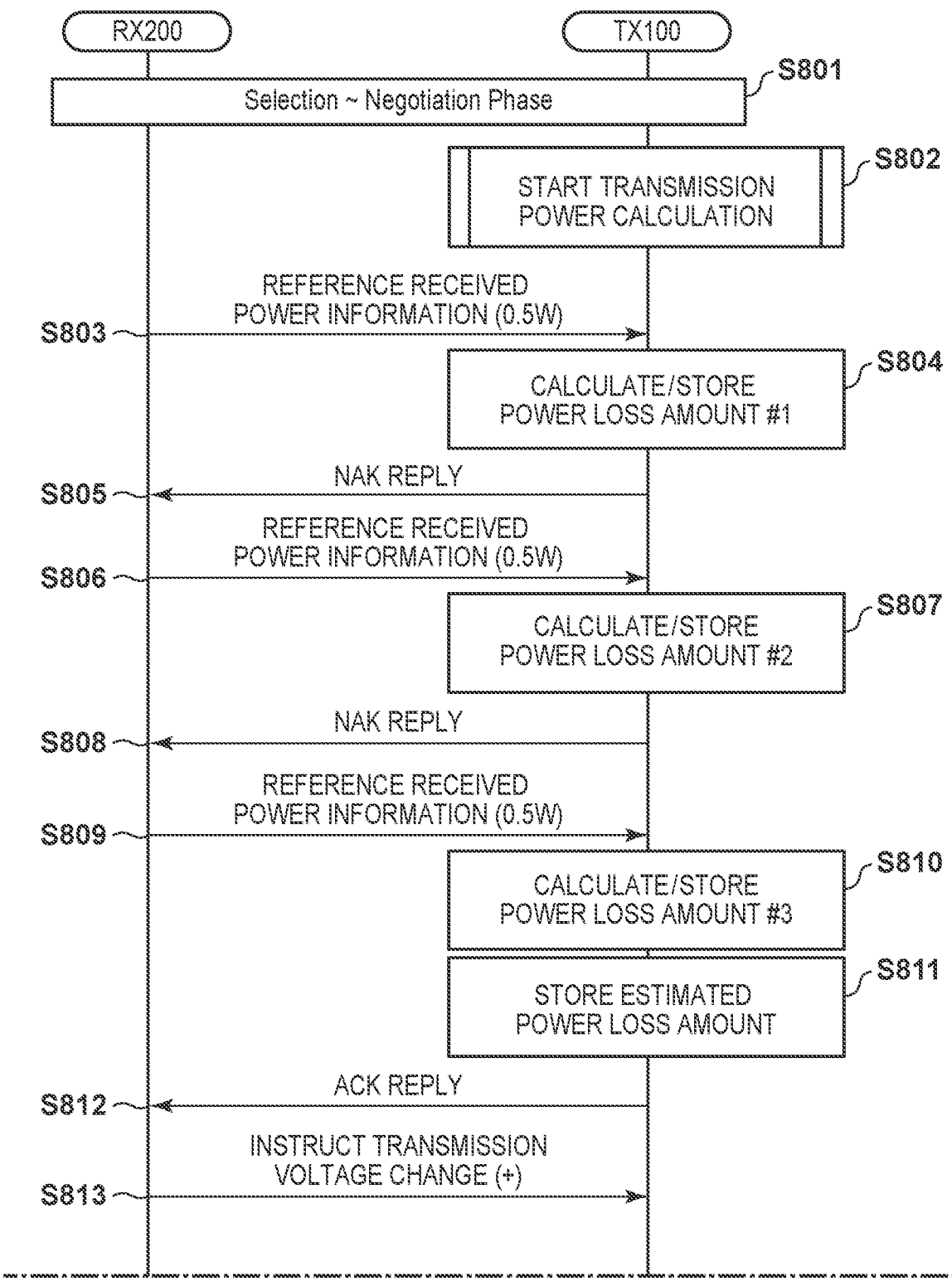
FIG. 8A is a diagram (1) illustrating an example of an operation sequence of a wireless power transmission system according to an embodiment.
Figure 8B:
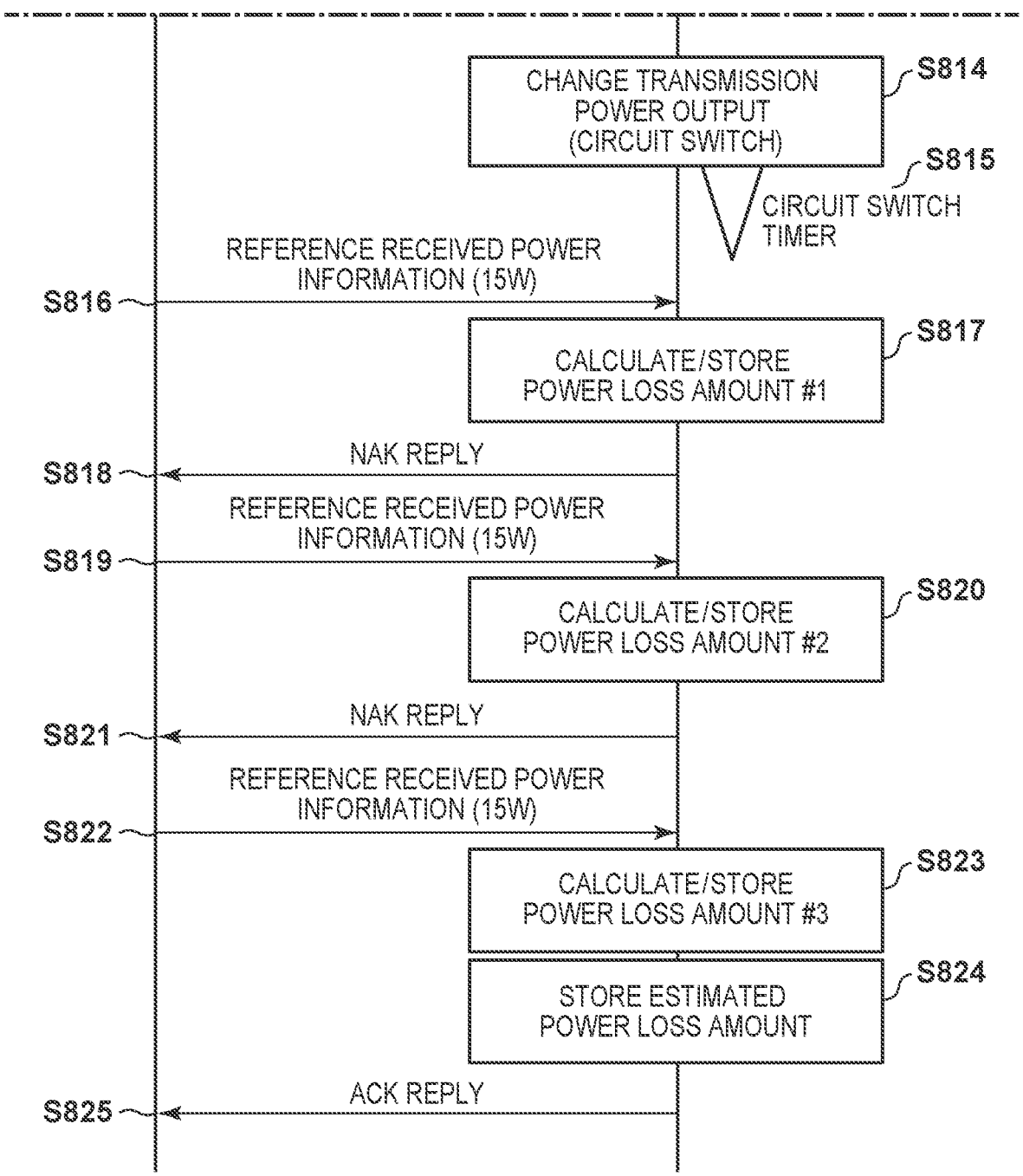
FIG. 8B is a diagram (2) illustrating an example of an operation sequence of a wireless power transmission system according to an embodiment.

FIGS. 8A and 8B are diagrams illustrating an example of a communication sequence in a case where the processing to calculate the estimated power loss at TX 100 can be executed under stable conditions.

Firstly, the TX 100 and the RX 200 execute the process from the Selection phase to the Negotiation phase in accordance with the WPC standard (step S801).

When the Negotiation phase ends, the calculation processing unit 304 of the TX 100 starts the processing to measure and calculate the transmission power described using FIG. 5 (step S802). Thereafter, the TX 100 executes the processing to continuously measure and calculate the transmission power until the Power Transfer phase ends.

The RX 200 transmits, to the TX 100, an RP packet (Mode=1) that specifies the received power value (approximately 500 mW) in a light load state as the first item of calibration request (step S803). The TX 100 identifies the transmission power data corresponding to the received power value including in the RP packet. Then, the TX 100 calculates the power loss from the difference between the average transmission power value included in the transmission power data and the received power value included in the RP packet, stores this as the first calculation result (step S804), and transmits a NAK packet to the RX 200 (step S805).

The RX 200, having received the NAK packet, again measures the received power value and transmits a RP packet (Mode=1) to the TX 100 (step S806). The TX 100, having received the RP packet, calculates the power loss in a similar manner, stores this as the second calculation result (step S807), and transmits a NAK packet to the RX 200 (step S808). Next, when the RX 200 again transmits an RP packet to the TX 100 (step S809), the TX 100 calculates the power loss (step S810), and calculates and stores the estimated power loss when 500 mW of power is being transmitted from the average of the first to third calculation results (step S811). Then, the TX 100 transmits an ACK packet to the RX 200 and reports that, in response to the first item of calibration request, the calculation of the estimated power loss is a success (step S812).

In order to calculate the estimated power loss at a high load state (when the received power is approximately 15 W), the RX 200, having received the ACK packet, instructs the TX 100 to increase the transmission voltage by transmitting a CE packet (step S813).

The TX 100, having received the CE packet, controls the power transmitting unit 103 to increase the transmission voltage by the instructed change amount (step S814). At this time, the power transmitting unit 103 controls turning on/off the FET, and the circuit is switched from a half bridge configuration to a full bridge configuration. The TX 100 activates a timer to measure the elapsed time from the circuit switching by the power transmitting unit 103 (step S815).

Thereafter, the RX 200 transmits, to the TX 100, an RP packet (Mode=2) that specifies the received power value (approximately 15 W) in a high load state as the second item of calibration request (step S816).

At the time when the TX 100 receives the RP packet, the timer activated in step S815 runs out, a predetermined amount of time from the circuit switching by the power transmitting unit 103 is determined to have elapsed. Thus, the TX 100 determines that power transmission is stable, calculates the power loss, and stores the calculation result as the first calculation result in a high load state (step S817). Then, the TX 100 transmits a NAK packet to the RX 200 (step S818). Thereafter, in a similar method to steps S806 to S810, the second and the third power loss are calculated and stored (steps S819 to S823).

The TX 100 calculates and stores the estimated power loss when 15 W of power is being transmitted from the average of the first to third calculation results (step S824). Then, the TX 100 transmits, to the RX 200, an ACK packet that reports that, in response to the second item of calibration request, the calculation of the estimated power loss is a success (step S825).

Figure 9A:
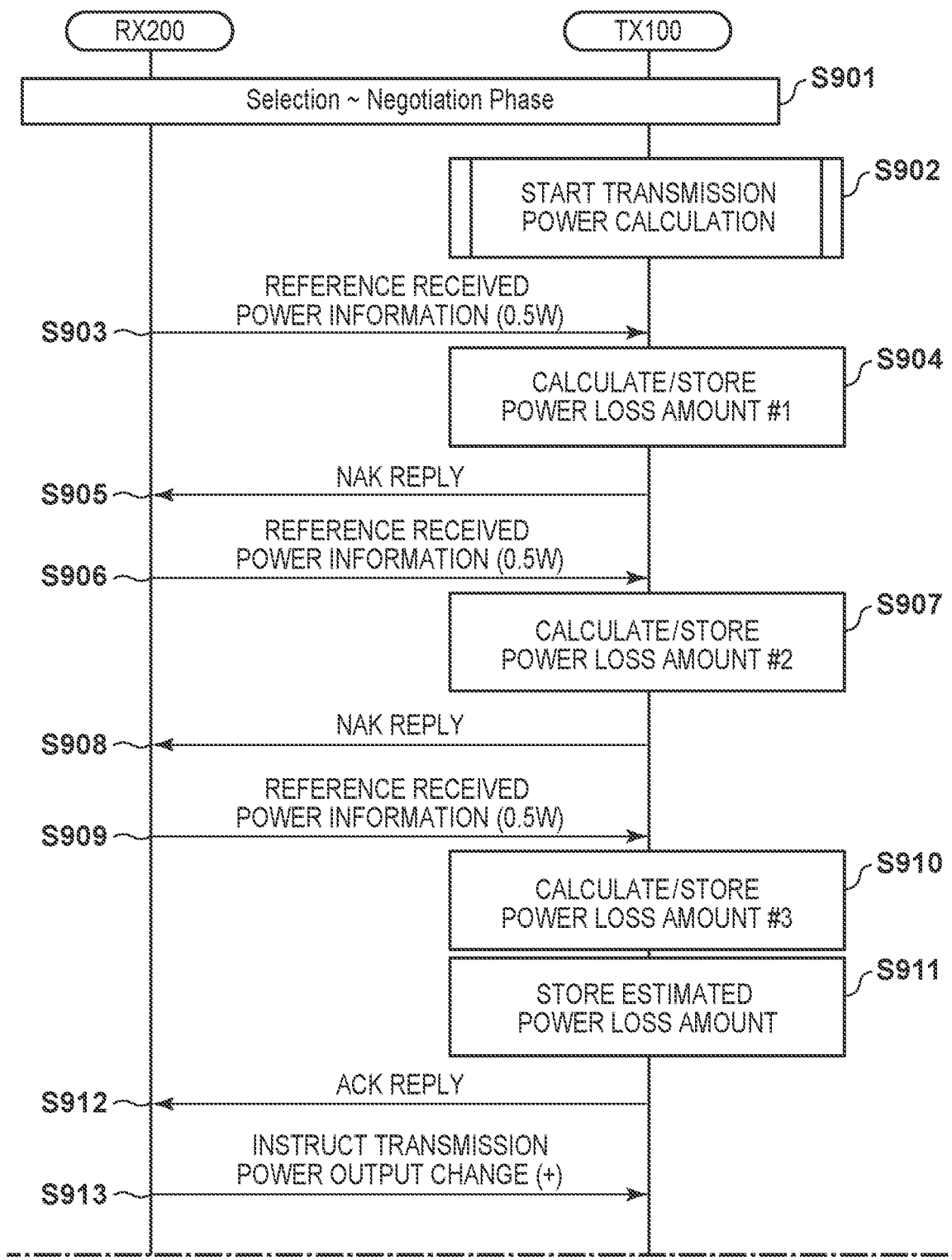
FIG. 9A is a diagram (1) illustrating an example of an operation sequence of a wireless power transmission system according to an embodiment.

FIGS. 9A and 9B are diagrams illustrating an example of a communication sequence in a case where the processing to calculate the estimated power loss at TX 100 is executed under unstable conditions. FIGS. 9A and 9B are diagrams illustrating a communication sequence based on the assumption that, corresponding to unstable conditions, an RP packet is transmitted from the RX 200 directly after the circuit switching by the power transmitting unit 103 of the TX 100.

The process from steps S901 to S915 are the same as that from steps S801 to S815 described using FIGS. 8A and 8B, and thus description thereof is omitted.

Directly after the CE packet is transmitted in step S913, the RX 200 transmits, to the TX 100, an RP packet (Mode=2) that specifies the received power value (approximately 15 W) in a high load state (step S916). At this time, the TX 100 determines that the power transmission is unstable due to a certain amount of time from the circuit switching by the power transmitting unit 103 not having elapsed (step S917), does not calculate or record the power loss, and transmits a NAK packet to the RX 200 (step S918).

Thereafter, when the RP packet is transmitted from the RX 200 after the timer activated in step S915 has run out (step S919, the TX 100 calculates the power loss for the first time here, and stores the calculation result as the first calculation result in a high load state (step S920).

The process from steps S921 to S928 are the same as that from steps S818 to S825 described using FIG. 8B, and thus description thereof is omitted.

In this manner, according to the present embodiment, the TX 100 can execute the processing to measure and calculate the estimated power loss with the RX 200 under stable conditions. In other words, the transmission power or the received power which vary when sudden environmental changes or the like occur can be removed from the calculation source data of the estimated power loss. This means that, regarding the transmission power and the received power as described above, they are not used in calculating the parameter for foreign object detection. Accordingly, the power regularly lost during the power transmitting process executed thereafter can be estimated with a high accuracy, and the foreign object detection accuracy during the power transmitting process can be improved.

In the embodiment described above, the method for calculating the estimated power loss does not use the transmission power value measured and calculated directly after switching of the internal circuit at the power transmitting unit 103 of the TX 100 and the received power value corresponding to the transmission power value. Also, in a case where the standard deviation or the like of the transmission power continuously measured and calculated by the calculation processing unit 304 is measured and the value is equal to or greater than a threshold, the data is not used in the method for calculating the estimated power loss. With such a configuration, variation in the measurement and calculation with a cause inside the TX 100 can be taken into account.

In the embodiment described above, the method described includes, in the TX 100, calculating the power loss on the basis of the received power value specified by an RP packet transmitted from the RX 200 and calculating the estimated power loss by averaging the calculation results. Also, in the method described above, at this time, the standard deviation or the like of the power loss or received power of a plurality of times calculated most recently is calculated, and in a case where the value is equal to or greater than a threshold, the data is not used in calculating the estimated power loss. With such a configuration, variation in the measurement and calculation data caused by the environment between the TX 100 and the RX 200 can be taken into account. For example, problems such as a value calculated when the contact surface between the TX 100 and the RX 200 gradually become misaligned due to small vibrations being used as the estimation value for when in a static state can be avoided.

In the method of the embodiment described above, in a case where the voltage change amount instructed by a CE packet from the RX 200 is equal to or greater than a threshold, the transmission power value used at that time by the TX 100 for measurement and calculation and the received power value corresponding to the transmission power value is not used in calculating the estimated power loss. Because the voltage change amount from the CE packet is determined as the result of processing and determination within the RX 200, this configuration allows variation in the measurement and calculation data with a cause inside the RX 200 to be taken into account.

The embodiment described above is a representative example, and the present embodiment is not limited to the embodiments described in the specification and in the drawings and modifications that do not change the gist can be made as appropriate.

In the present embodiment, when the TX 100 receives a RP packet, in a case where there is instability and the estimated power loss cannot be calculated, a NAK is repeated. However, no such limitation is intended. In a configuration of another possible example, in a case where an ACK is not returned for a certain number of time or more or a certain amount of time or more, the TX 100 determines that the environment is one in which foreign object detection cannot be normally performed, stops transmitting power, and returns to the Selection phase. Such a configuration can prevent the processing to calculate the estimated power loss from being continuously performed in a condition where the transmission power output is always unstable.

In another possible configuration, in a case where an ACK is not returned for a certain number of times or more or a certain amount of time or more, the TX 100 determines that the state in which there is variation in the calculated value is a normal state, changes the thresholds described above to a large value, and determines whether or not there is stability. Also, in this case, the threshold (difference with the estimated power loss) of when foreign object detection processing is actually performed may be changed. With such a configuration, in an environment with regular vibrations such as in a moving vehicle, for example, power transmitting processing and foreign object detection processing can be executed in a suitable manner.

Also, in the present embodiment, as the method of determining whether or not the power transmitting process from the TX 100 to the RX 200 is stable, a method is used that uses the variations in the transmission power, the power loss, and the received power, the instructed change amount of the power, and the like. However, no such limitation is intended. For example, the TX 100 may be provided with a piece of hardware such as a vibration sensor or a magnetic sensor, and, in a case where the sensor detects vibration or magnetism equal to or greater than a threshold, the power transmitting process may be determined to be unstable and a NAK may be returned in response to an RP packet. Also, the TX 100 may be wirelessly connected to an external apparatus different from the RX 200, and information representing whether or not the power transmitting process from an external apparatus is stable may be obtained and determination may be performed. Including the method described in the present embodiment, by combining these methods, the accuracy of the calculation processing of the estimated power loss can be further improved.

Also, in the example of the present embodiment described above, the estimated power loss is calculated at two points of power receiving states of the power receiving apparatus, a low load state and a high load state. However, no such limitation is intended. For example, the method described above may be used when calculating the estimated power loss using three or more points. Also, in the example described above, after the Negotiation phase is complete, the processes in FIGS. 6A and 6B are executed in the time before the charging processing is started. However, no such limitation is intended. For example, the processes in FIGS. 6A and 6B may be executed after the TX 100 transitions to the Power Transfer phase when a third estimated power loss is calculated.

Also in the example of the present embodiment described above, a CE packet is used as a request signal for controlling the transmission power of the TX 100. However, no such limitation is intended. Also, in the example described above, an RP packet is used as a signal for the RX 200 to notify the TX 100 of the received power value. However, no such limitation is intended. In any case, another discretionary packet may be used for instruction and notification. Also, a plurality of packets may be used for instruction and notification, or a single packet may be used for two instructions or notifications.

In the present embodiment described above, the various thresholds and time out values are predetermined fixed values. However, no such limitation is intended. The values may dynamically change due to changes in the surrounding environment or the environment in which the software or hardware processing is executed, and for example, the values may be determined by negotiation between the TX 100 and the RX 200 in the Negotiation phase.

Also, in the present embodiment described above, in step S613 in FIG. 6B, the transmission power and the estimated power loss are associated together and stored, and this information is used to generate the graph in FIG. 10. However, other combinations may be used. For example, the received power and the estimated power loss may be associated together and stored and this information may be used to generate a graph, or the transmission power and the received power may be associated together and stored and this information may be used to generate a graph. Also, all three pieces of information may be stored. In other words, it is only required that at least two from among the transmission power, the received power, and the power loss are associated together and stored. Also, in the graph in FIG. 10, the horizontal axis represents the transmission power and the vertical axis represents the received power. However, any combination of the information including the transmission power, the received power, and the power loss may be used for the horizontal axis and the vertical axis. In a case of any such graph, the constant in the calculation formula representing the graph corresponds to a parameter for foreign object detection.

Also, at least a part of the processes illustrated in the flowcharts of FIGS. 5 to 7 and 11 may be implemented by hardware. In the case of implementing processing by hardware, for example, using a predetermined compiler, the processing can be implemented by automatically generating a dedicated circuit on an FPGA from a program for implementing the steps. In addition, similarly to an FPGA, a gate array circuit may be formed and implemented as hardware.

According to the above embodiments, the calculation accuracy of a parameter used to determine whether or not an object that is not the intended power transmission target exists can be improved.

Other Examples

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

The invention claimed is:

1. A communication method for a power transmission apparatus, the communication method comprising:
   receiving a plurality of Control Error packets including information for controlling transmission power;
   receiving a first received power packet including information indicating a value of a first received power;
   receiving, after receiving the first received power packet, a second received power packet including information indicating a value of a second received power;
   transmitting an acknowledgement response or a negative acknowledgement response to the first received power packet based on values indicated by a plurality of Control Error packets received from the power receiving apparatus;
   transmitting an acknowledgement response or a negative acknowledgement response to the second received power packet based on values indicated by a plurality of Control Error packets received after transmitting an acknowledgement response to the first received power packet; and,
   receiving, after transmitting an acknowledgement response to the second received power packet, a third received power packet including information indicating a third received power value.

2. A communication method for a power transmission apparatus, the communication method comprising:
   receiving a plurality of Control Error packets including information for controlling transmission power;
   receiving a first received power packet including information indicating a value of a first received power;
   receiving, after receiving the first received power packet, a second received power packet including information indicating a value of a second received power;
   transmitting an acknowledgement response to the first received power packet in a case where a value indicated by a Control Error packet received from a power receiving apparatus is a predetermined value;
   transmitting an acknowledgement response to the second received power packet in a case where a value indicated by a Control Error packet received after transmitting an acknowledgement response to the first received power packet is a predetermined value; and,
   receiving, after transmitting an acknowledgement response to the second received power packet, a third received power packet including information indicating a third received power value.

3. The communication method according to claim 2, wherein the predetermined value is a value that does not exceed a predetermined threshold.

4. A power transmission apparatus comprising:
   a power transmission unit configured to wirelessly transmit power to a power receiving apparatus; and
   a communication unit configured to communicate with the power receiving apparatus,
   wherein the communication unit is configured to perform:
   receiving a plurality of Control Error packets including information for controlling transmission power;
   receiving a first received power packet including information indicating a value of a first received power;
   receiving, after receiving the first received power packet, a second received power packet including information indicating a value of a second received power;
   transmitting an acknowledgement response or a negative acknowledgement response to the first received power packet based on values indicated by a plurality of Control Error packets received from the power receiving apparatus;
   transmitting an acknowledgement response or a negative acknowledgement response to the second received power packet based on values indicated by a plurality of Control Error packets received after transmitting an acknowledgement response to the first received power packet; and,
   receiving, after transmitting an acknowledgement response to the second received power packet, a third received power packet including information indicating a third received power value.

5. A power transmission apparatus comprising:
   a power transmission unit configured to wirelessly transmit power to a power receiving apparatus; and
   a communication unit configured to communicate with the power receiving apparatus,
   wherein the communication unit is configured to perform:
   receiving a plurality of Control Error packets including information for controlling transmission power;
   receiving a first received power packet including information indicating a value of a first received power;
   receiving, after receiving the first received power packet, a second received power packet including information indicating a value of a second received power;

transmitting an acknowledgement response to the first received power packet in a case where a value indicated by a Control Error packet received from a power receiving apparatus is a predetermined value;

transmitting an acknowledgement response to the second received power packet in a case where a value indicated by a Control Error packet received after transmitting an acknowledgement response to the first received power packet is a predetermined value; and, receiving, after transmitting an acknowledgement response to the second received power packet, a third received power packet including information indicating a third received power value.

6. A non-transitory computer-readable storage medium storing a program for causing a computer to perform a communication method performed by a power transmission apparatus, the communication method comprising:

receiving a plurality of Control Error packets including information for controlling transmission power;

receiving a first received power packet including information indicating a value of a first received power;

receiving, after receiving the first received power packet, a second received power packet including information indicating a value of a second received power;

transmitting an acknowledgement response or a negative acknowledgement response to the first received power packet based on values indicated by a plurality of Control Error packets received from the power receiving apparatus;

transmitting an acknowledgement response or a negative acknowledgement response to the second received power packet based on values indicated by a plurality of Control Error packets received after transmitting an acknowledgement response to the first received power packet; and, receiving, after transmitting an acknowledgement response to the second received power packet, a third received power packet including information indicating a third received power value.

7. A non-transitory computer-readable storage medium storing a program for causing a computer to perform a communication method performed by a power transmission apparatus, the communication method comprising:

receiving a plurality of Control Error packets including information for controlling transmission power;

receiving a first received power packet including information indicating a value of a first received power;

receiving, after receiving the first received power packet, a second received power packet including information indicating a value of a second received power;

transmitting an acknowledgement response to the first received power packet in a case where a value indicated by a Control Error packet received from a power receiving apparatus is a predetermined value;

transmitting an acknowledgement response to the second received power packet in a case where a value indicated by a Control Error packet received after transmitting an acknowledgement response to the first received power packet is a predetermined value; and, receiving, after transmitting an acknowledgement response to the second received power packet, a third received power packet including information indicating a third received power value.

\* \* \* \* \*